(12) United States Patent
Kravitz

(10) Patent No.: US 12,154,057 B1
(45) Date of Patent: Nov. 26, 2024

(54) SYSTEMS AND METHODS FOR USING A GRAPHICAL USER INTERFACE OF A MARITIME FACTORY SHIP WITH A DIGITAL TWIN FACTORY SHIP MODEL

(71) Applicant: BlueForge Alliance, Bryan, TX (US)

(72) Inventor: Arnold Kravitz, St. Petersburg, FL (US)

(73) Assignee: BlueForge Alliance, Bryan, TX (US)

( * ) Notice: Subject to any disclaimer, the term of this patent is extended or adjusted under 35 U.S.C. 154(b) by 0 days.

(21) Appl. No.: 18/614,451

(22) Filed: Mar. 22, 2024

Related U.S. Application Data

(63) Continuation-in-part of application No. 18/611,506, filed on Mar. 20, 2024.

(60) Provisional application No. 63/602,962, filed on Nov. 27, 2023, provisional application No. 63/541,466, filed on Sep. 29, 2023.

(51) Int. Cl.
  *G06Q 10/0637* (2023.01)
  *G06F 9/451* (2018.01)
  *G06Q 50/04* (2012.01)

(52) U.S. Cl.
  CPC ......... *G06Q 10/0637* (2013.01); *G06F 9/451* (2018.02); *G06Q 50/04* (2013.01)

(58) Field of Classification Search
  CPC ..... G06F 9/415; G06Q 10/0637; G06Q 50/04
  See application file for complete search history.

(56) References Cited

U.S. PATENT DOCUMENTS

| | | | | |
|---|---|---|---|---|
| 2,945,465 A | * | 7/1960 | Barton | B65D 88/78 114/240 R |
| 3,455,115 A | * | 7/1969 | Ellis | E02B 3/064 14/27 |
| 3,665,882 A | * | 5/1972 | Georgiev | B63B 35/34 52/648.1 |
| 3,785,314 A | * | 1/1974 | Scanlan | B63B 35/44 114/266 |

(Continued)

FOREIGN PATENT DOCUMENTS

| | | |
|---|---|---|
| CN | 109367004 A | 2/2019 |
| CN | 208915362 | 5/2019 |

(Continued)

*Primary Examiner* — S. Joseph Morano
*Assistant Examiner* — Jovon E Hayes
(74) *Attorney, Agent, or Firm* — Dickinson Wright PLLC; Stephen A. Mason; Jonathan H. Harder

(57) ABSTRACT

In one embodiment, a computer-implemented method includes receiving first information pertaining to a configuration of a factory ship, and causing a graphical user interface (GUI) to be presented on a computing device. The GUI represents the configuration of the factory ship. The method includes receiving second information pertaining to a mission, determining, based on the second information, one or more parts required to perform the mission, determining, based on the one or more parts and the first information, a reconfiguration of the factory ship to enable manufacturing the one or more parts, causing the GUI to be modified to represent the reconfiguration of the factory ship, and simulating, via the GUI and using a digital twin factory ship model of the reconfiguration, operation of the factory ship to manufacture the one more parts.

20 Claims, 12 Drawing Sheets

(56) References Cited

U.S. PATENT DOCUMENTS

| | | | | |
|---|---|---|---|---|
| 3,962,981 | A | * | 6/1976 | O'Kon .................... B63B 35/38 |
| | | | | 114/264 |
| 5,631,028 | A | * | 5/1997 | Mizokawa ......... B29D 30/0016 |
| | | | | 425/29 |
| 2007/0094946 | A1 | * | 5/2007 | Schoeny ................... E04H 5/02 |
| | | | | 52/79.1 |
| 2022/0245574 | A1 | * | 8/2022 | Cella .................... G06Q 10/087 |
| 2023/0083724 | A1 | * | 3/2023 | Cella .................... G06Q 20/389 |
| | | | | 705/28 |
| 2023/0098602 | A1 | * | 3/2023 | Cella .................... B29C 64/386 |
| | | | | 700/248 |
| 2023/0222531 | A1 | * | 7/2023 | Cella ............... G06Q 10/06315 |
| | | | | 705/7.31 |

FOREIGN PATENT DOCUMENTS

| | | | |
|---|---|---|---|
| CN | 111660560 | A | 9/2020 |
| CN | 114802594 | A | 7/2022 |
| ES | 2637237 | A1 | 12/2018 |
| FR | 2717147 | A1 | 9/1995 |
| KR | 101952367 | B1 | 5/2019 |
| WO | 2023042129 | A1 | 3/2023 |

* cited by examiner

SYSTEMS AND METHODS FOR USING A GRAPHICAL USER INTERFACE OF A MARITIME FACTORY SHIP WITH A DIGITAL TWIN FACTORY SHIP MODEL

CROSS-REFERENCE TO RELATED APPLICATIONS

This is a continuation-in-part of U.S. application Ser. No. 18/611,506, filed Mar. 20, 2024, which claims the benefit of U.S. Provisional Application No. 63/541,466, filed on Sep. 29, 2023, and U.S. Provisional Application No. 63/602,962, filed on Nov. 27, 2023, each of which is incorporated by reference in its entirety.

FIELD

This disclosure relates in general to manufacturing and, in particular, to systems and methods for manufacturing products on a maritime vessel while at sea.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Conventional manufacturing on land (e.g., in one or more fixed or immobile facilities) is very well developed throughout the world. Generally, product development and manufacturing may be performed in a single facility, in different locations within a single facility, in different stages in multiple facilities with transportation of products between the respective facilities, etc. Each product and location may have various associated manufacturing procedures, processes, standards, and so on, which may be dependent upon various factors including, but not limited to, the product and/or type of product being manufactured, the facility or type of facility, and environmental factors affecting manufacturing procedures.

SUMMARY

In one embodiment, a computer-implemented method includes receiving first information pertaining to a configuration of a factory ship, and causing a graphical user interface (GUI) to be presented on a computing device. The GUI represents the configuration of the factory ship. The method includes receiving second information pertaining to a mission, determining, based on the second information, one or more parts required to perform the mission, determining, based on the one or more parts and the first information, a reconfiguration of the factory ship to enable manufacturing the one or more parts, causing the GUI to be modified to represent the reconfiguration of the factory ship, and simulating, via the GUI and using a digital twin factory ship model of the reconfiguration, operation of the factory ship to manufacture the one more parts.

In some embodiments, a system may include a memory device storing instructions and a processing device communicatively coupled to the memory device. The processing device may execute the instructions to perform any of the methods described herein.

In some embodiments, a tangible, non-transitory computer readable medium stores instructions that, when executed, cause a processing device to perform any of the methods described herein.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

So that the manner in which the features and advantages of the embodiments are attained and can be understood in more detail, a more particular description can be had by reference to the embodiments that are illustrated in the appended drawings. However, the drawings illustrate only some embodiments and are not to be considered limiting in scope since there can be other equally effective embodiments.

Figure 1A:
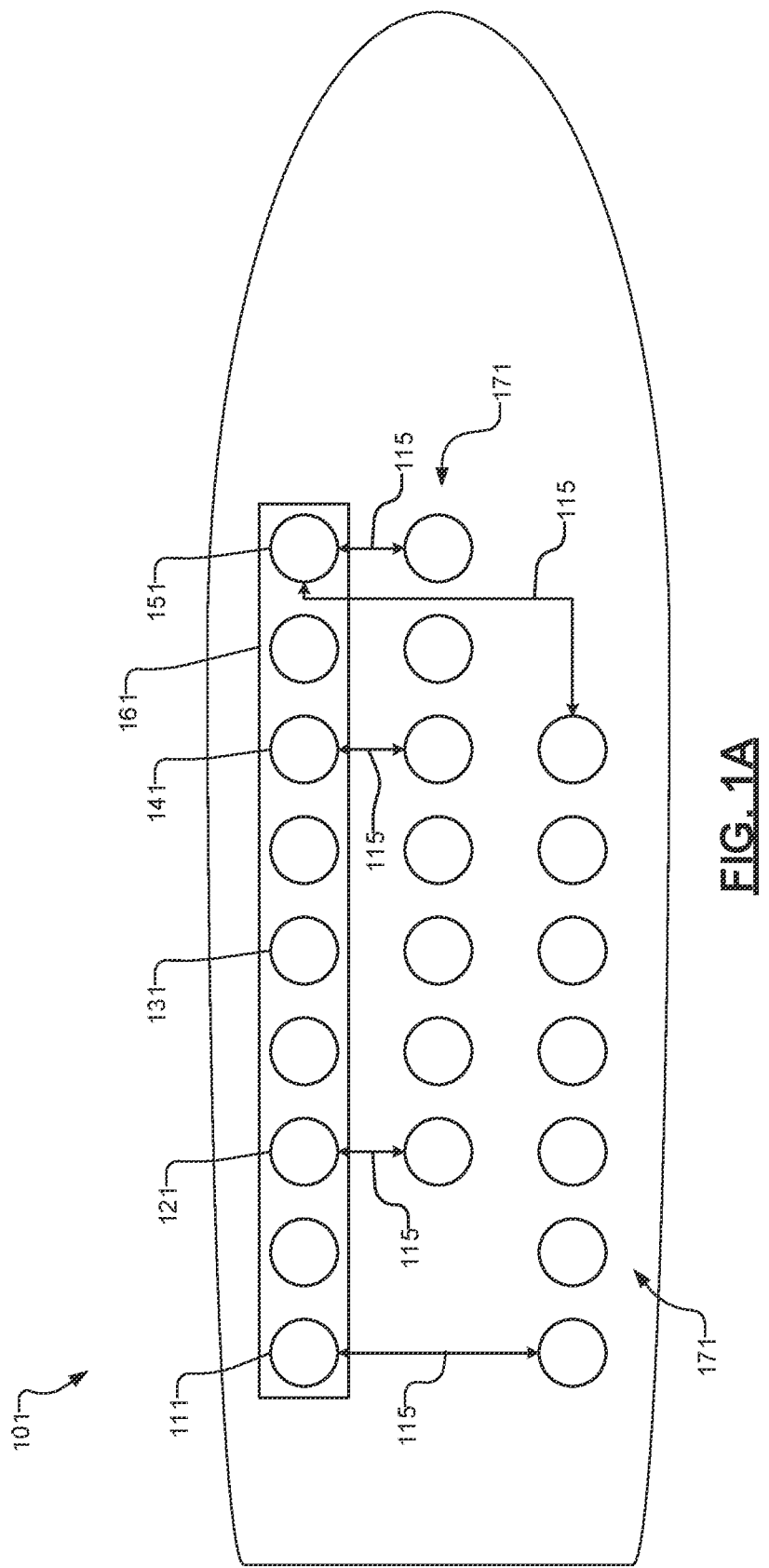

It shall be noted that some of the details and/or features shown in the drawings herein may not be drawn to scale for clarity purposes and some elements.

Figure 1B:
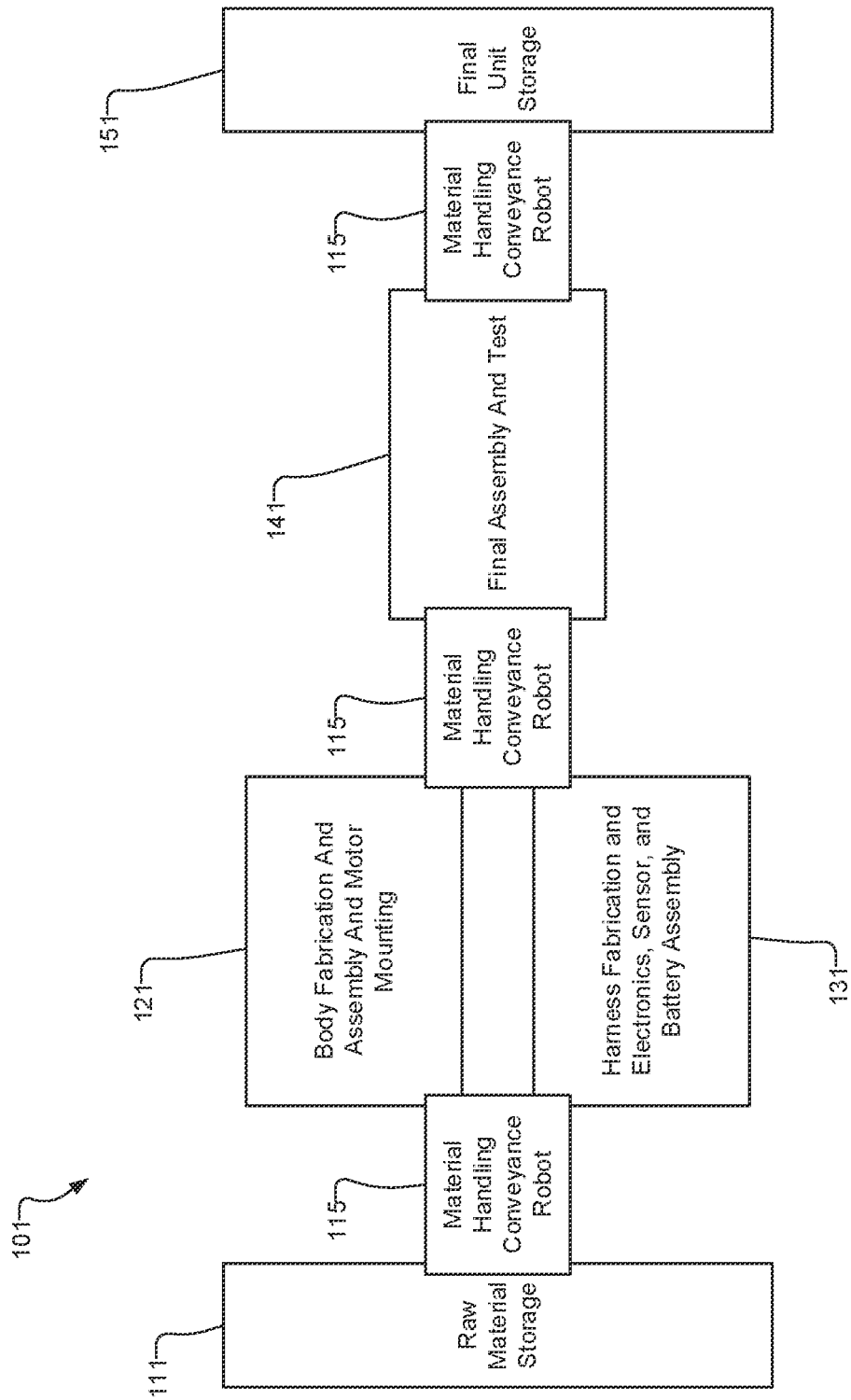
Figure 2:
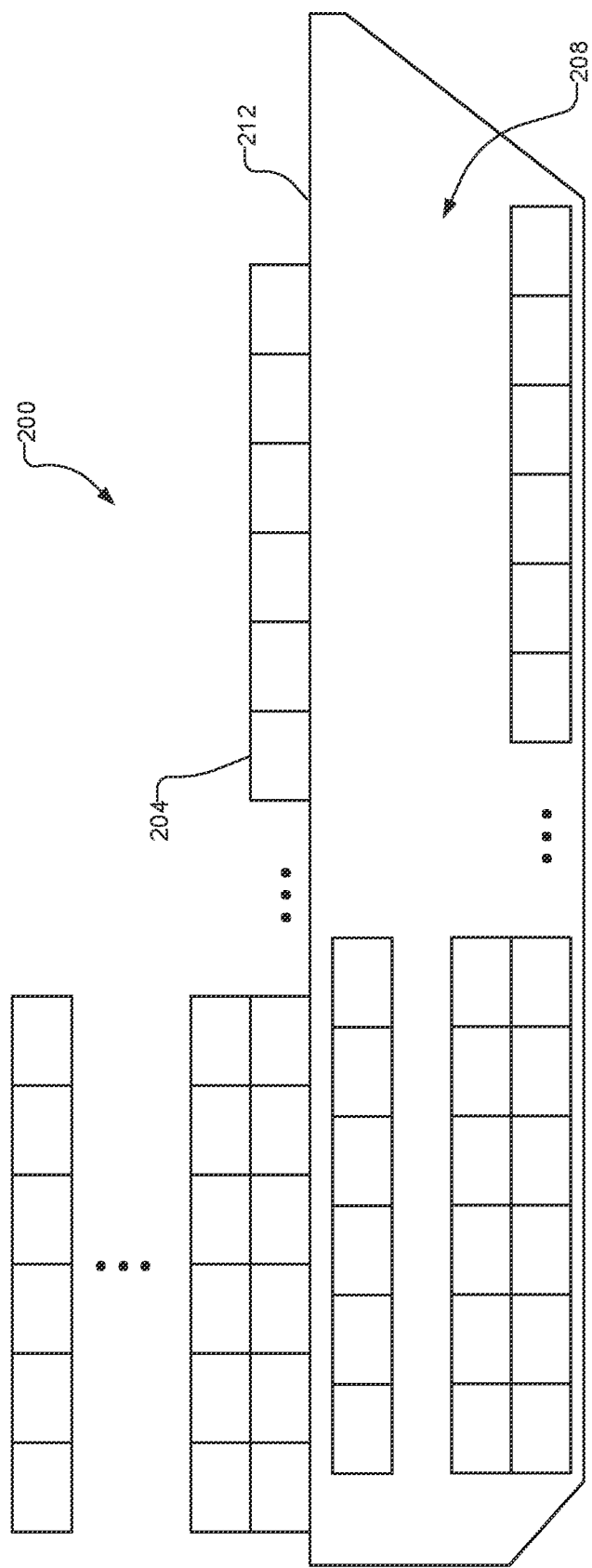
Figure 3:
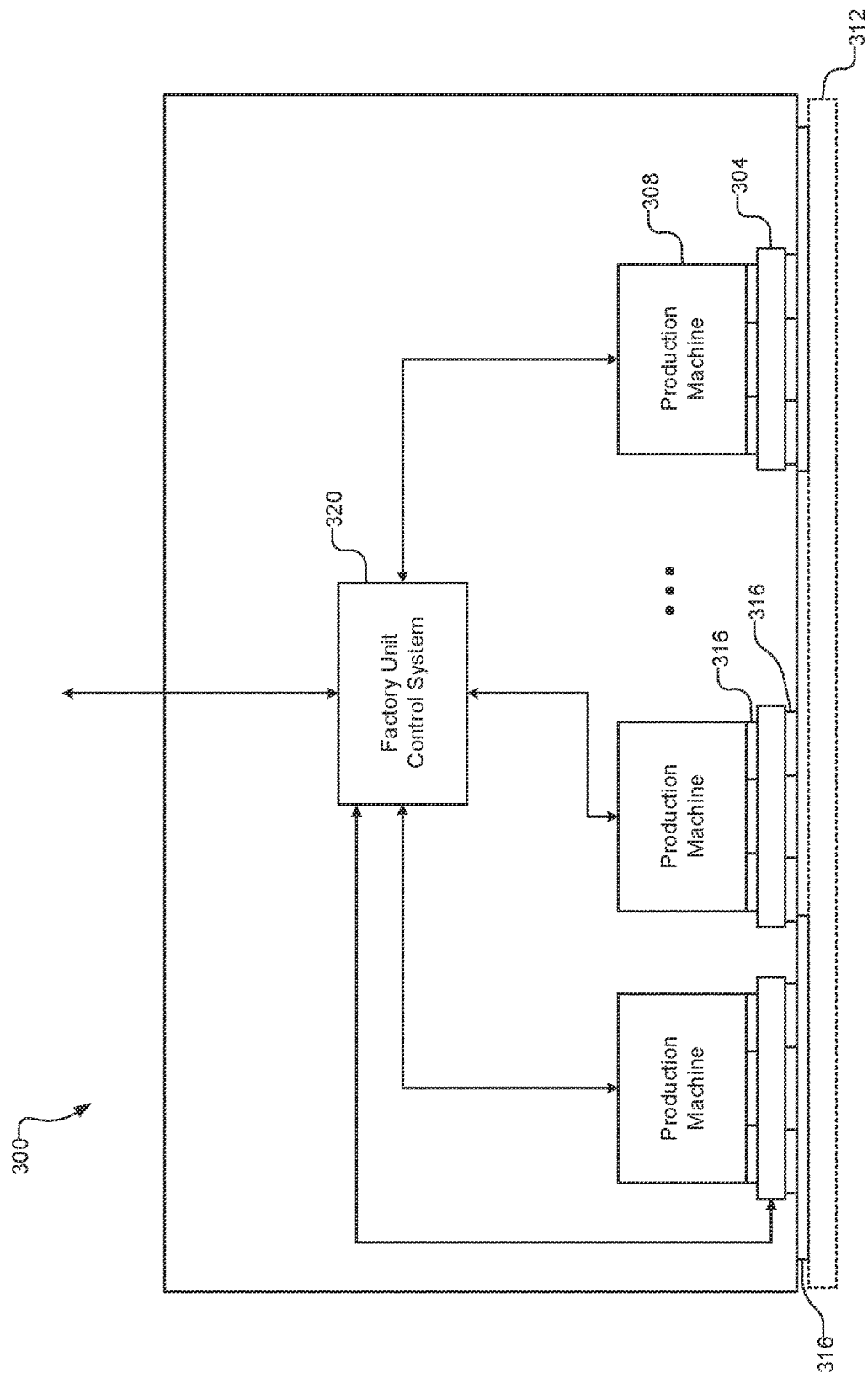
Figure 4:
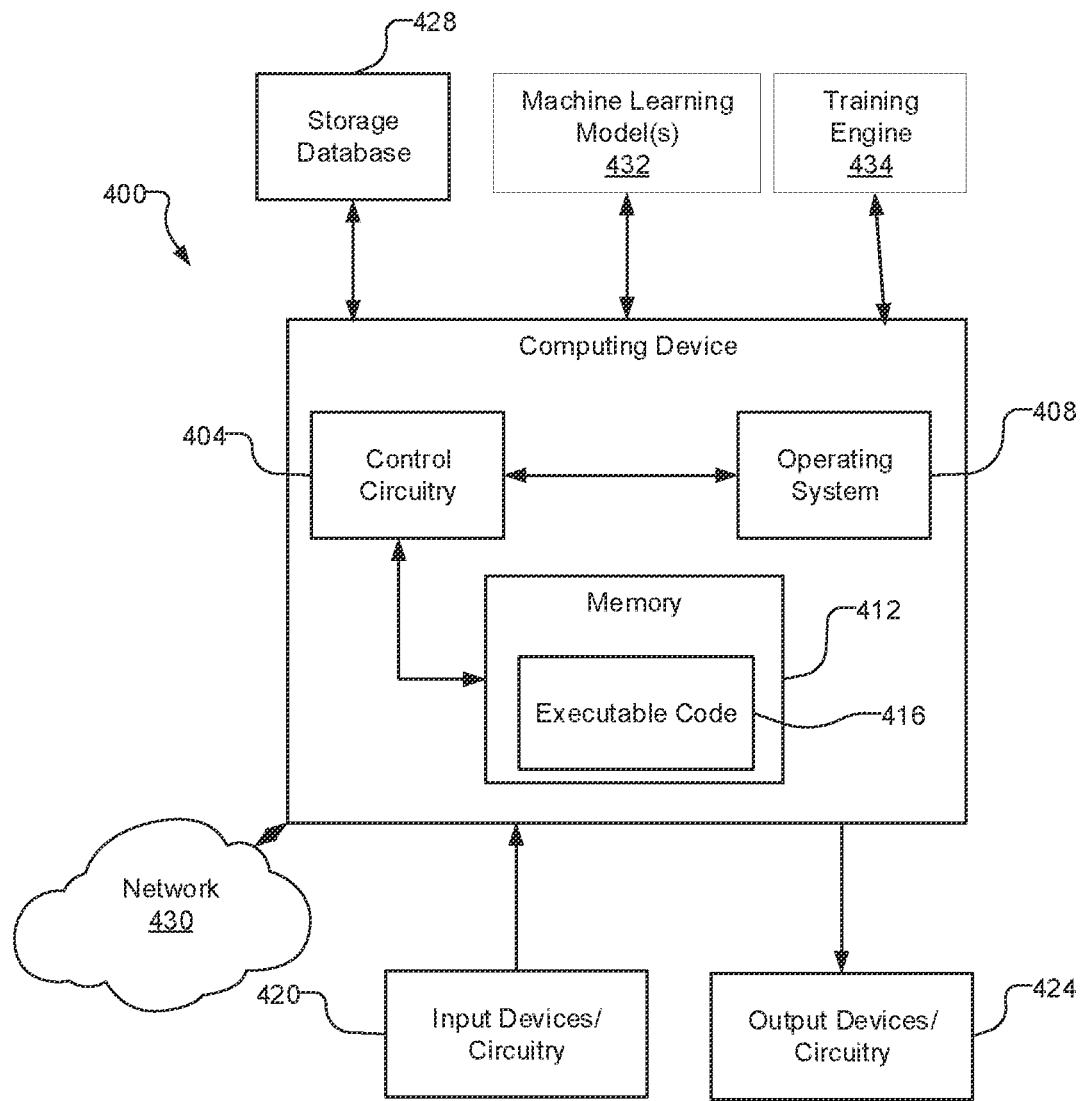
Figure 5:
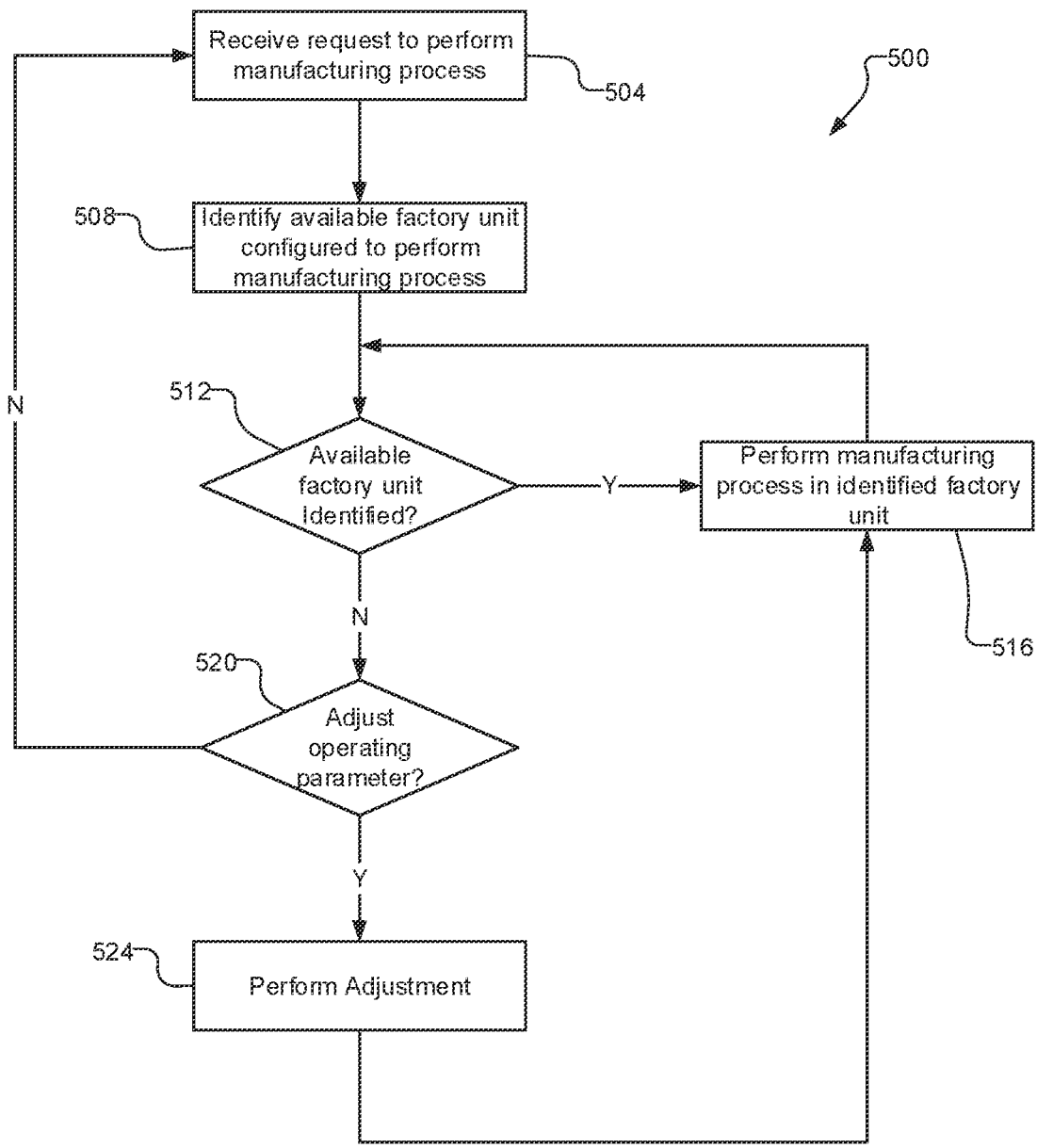
Figure 6:
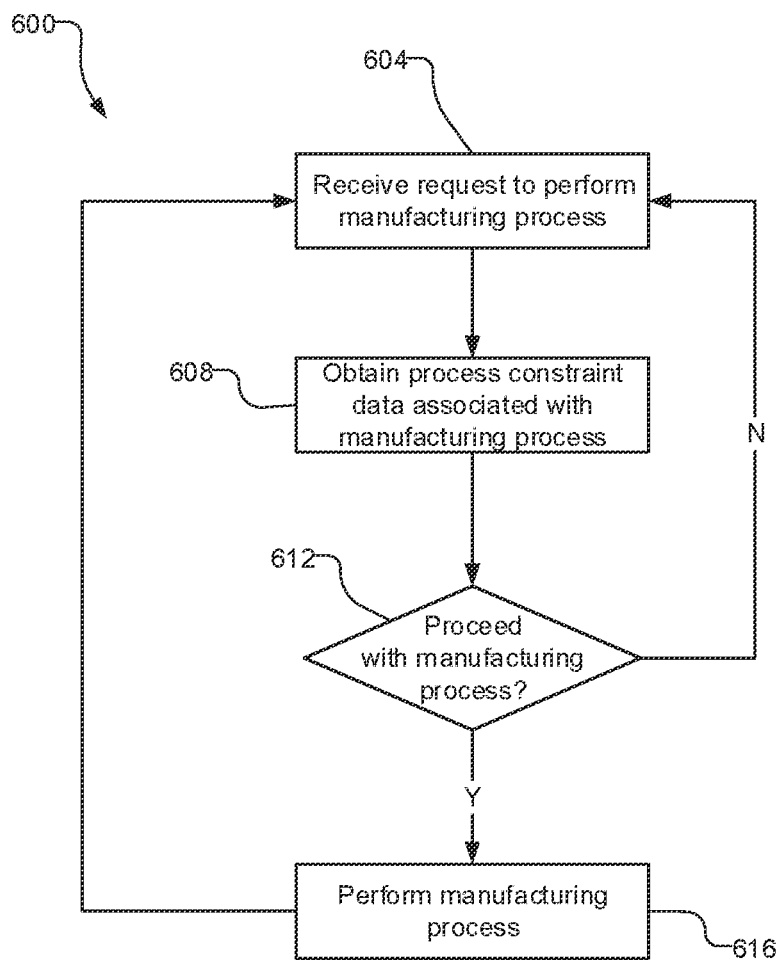
Figure 7:
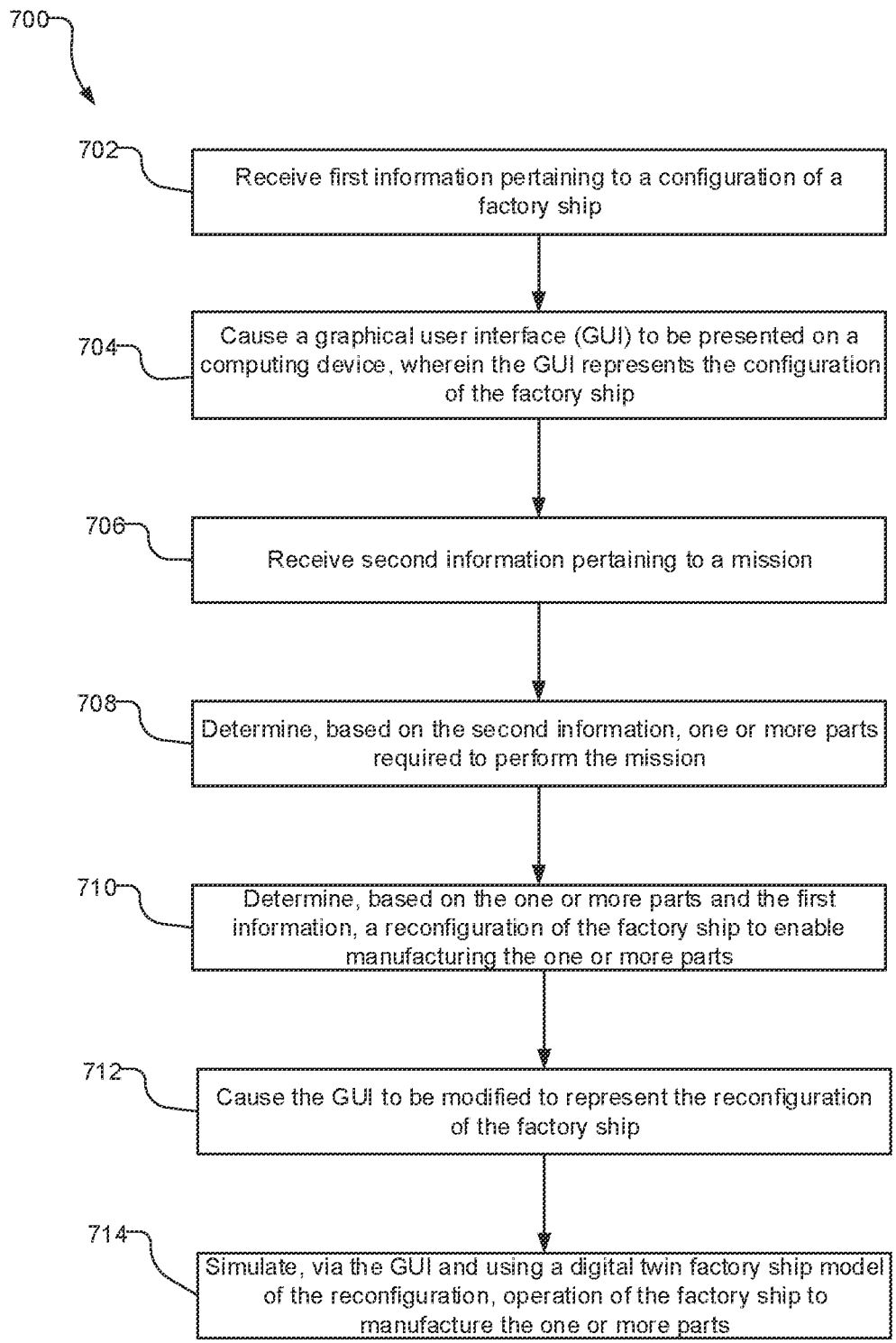
Figure 8:
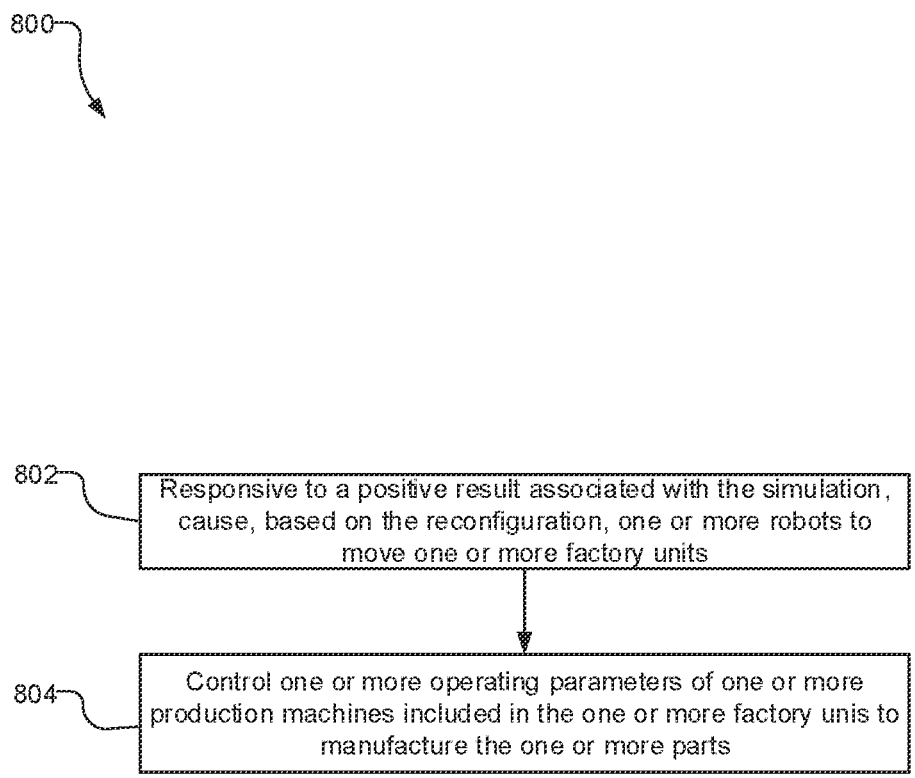
Figure 9:
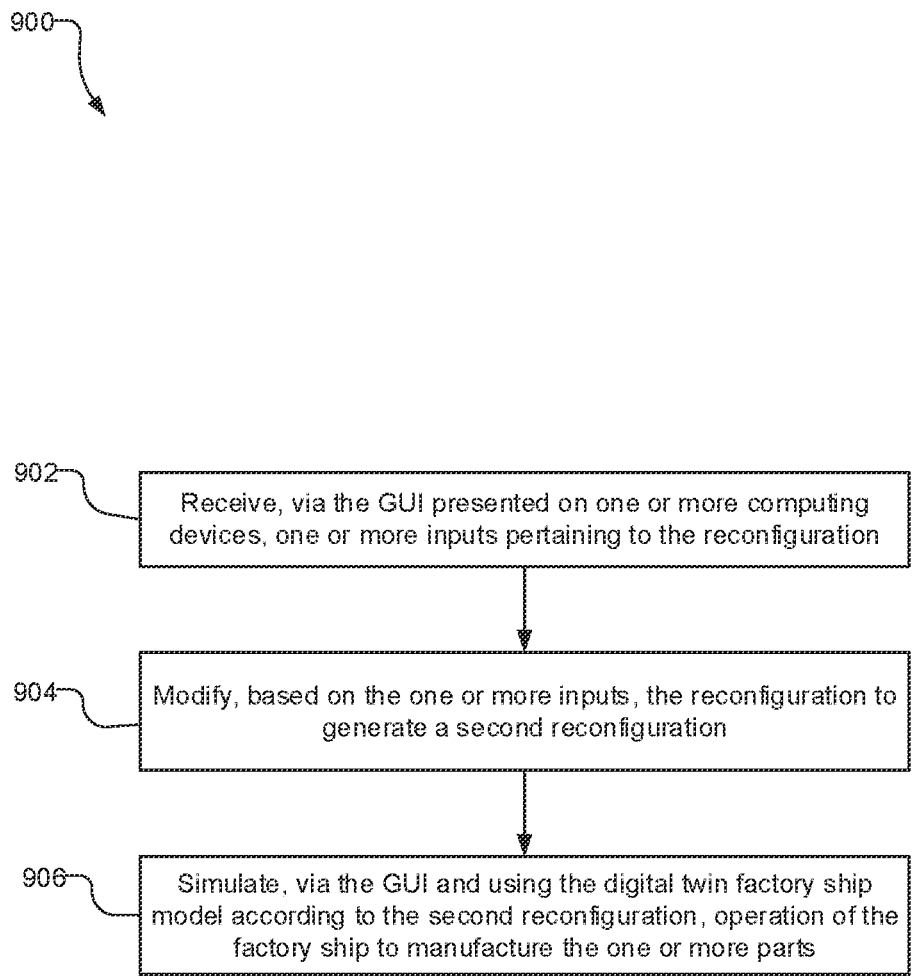
Figure 10:
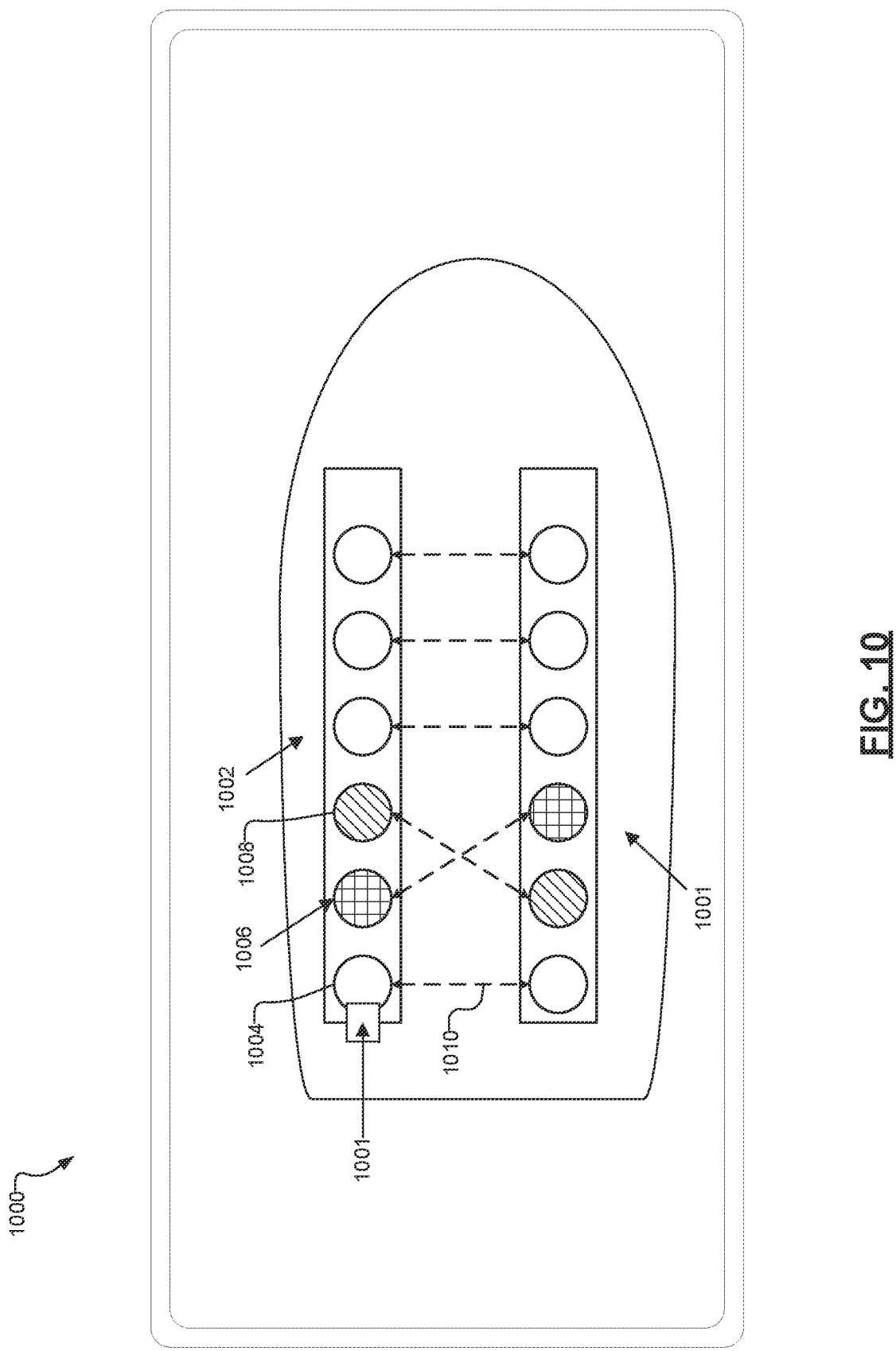
Figure 11:
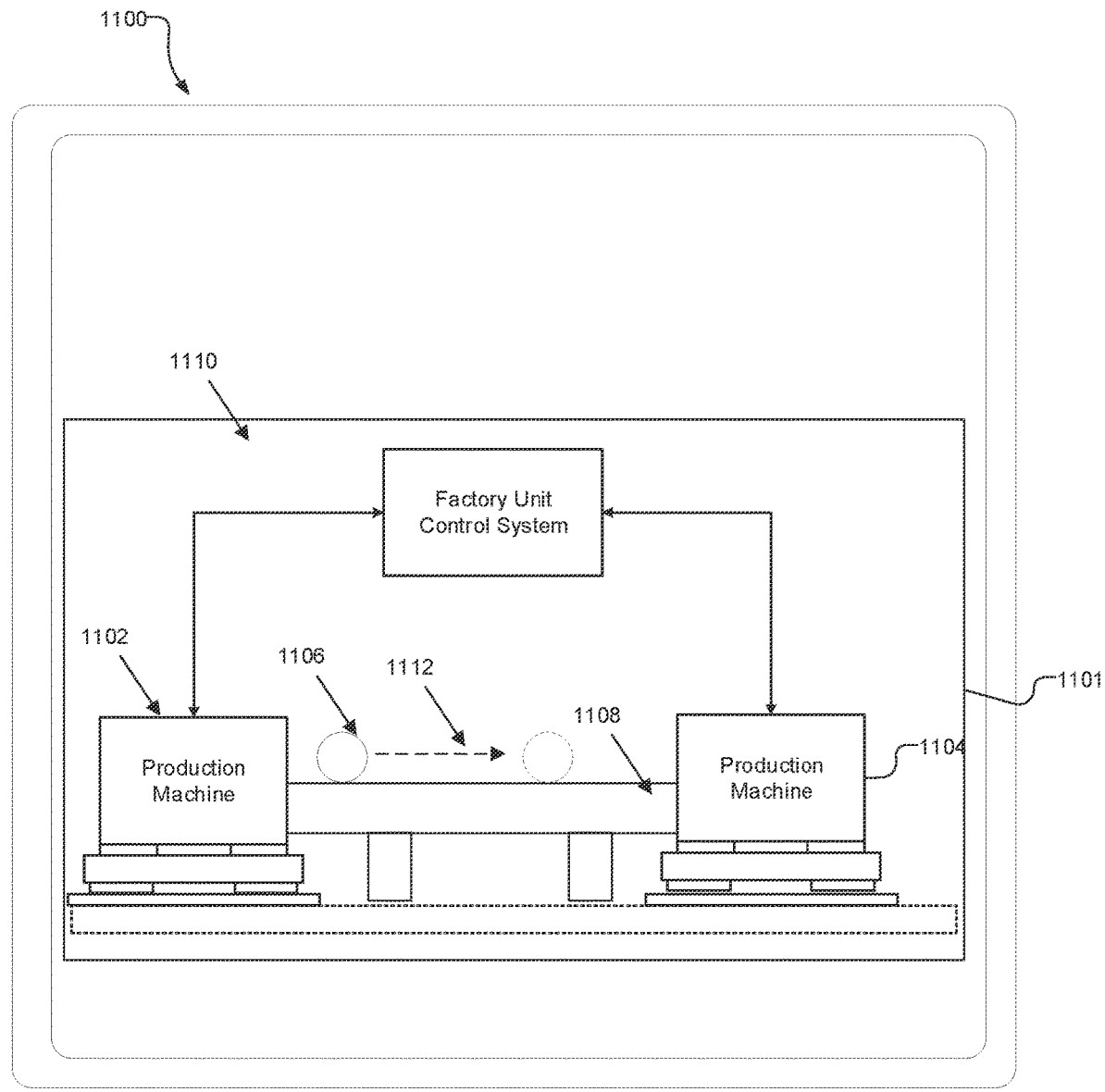

FIGS. 1A and 1B schematically illustrate an example factory ship according to the principles of the present disclosure;

FIG. 2 is a side view of another example factory ship according to the principles of the present disclosure;

FIG. 3 shows an example factory unit according to the principles of the present disclosure;

FIG. 4 shows a block diagram of an example computing device configured to implement functions of the systems and methods of the present disclosure;

FIG. 5 illustrates steps of an example method for performing a maritime manufacturing process according to the principles of the present disclosure;

FIG. 6 illustrates steps of another example method for performing a maritime manufacturing process according to the principles of the present disclosure;

FIG. 7 illustrates steps of an example method for using a graphical user interface to configure a factory ship according to principles of the present disclosure;

FIG. 8 illustrates steps of an example method for arranging one or more factory units and controlling production machines included in the factory units according to principles of the present disclosure;

FIG. 9 illustrates steps of another example method for using a graphical user interface to configure a factory ship according to principles of the present disclosure;

FIG. 10 shows an example graphical user interface used to configure factory units of a factory ship according to principles of the present disclosure; and FIG. 11 shows an example graphical user interface used to simulate a maritime manufacturing process via production machinery according to principles of the present disclosure.

In the drawings, reference numbers may be reused to identify similar and/or identical elements.

DETAILED DESCRIPTION

Typically, manufacturing of various products is performed in one or more facilities or locations. Each product and location may have various associated manufacturing procedures, processes, standards, and so on, which may be dependent upon various factors including, but not limited to, the product and/or type of product being manufactured, the facility or type of facility, and environmental factors affecting manufacturing procedures. For example, different locations may be associated with respective variations in procedures or processes.

Manufacturing systems and methods according to the present disclosure are configured to implement control of various manufacturing processes performed on a maritime vessel or ship (e.g., "a factory ship"). Complete or partial manufacturing of products on a ship (either while moving or stationary at sea, in port, etc.) may be associated with numerous difficulties and challenges. Example difficulties include, but are not limited to, difficulties associated with: movement of the ship during manufacturing; changes in a location of the ship during and/or between different manufacturing steps; changes in environmental conditions due to changes in location of the ship during and and/or between different manufacturing steps; multiple product types being manufactured in a single location or manufacturing compartment within a ship; multiple types of manufacturing processes being performed in a single location or manufacturing compartment within a ship (and hot-swapping between the types of manufacturing processes based on need); and/or combinations thereof. Systems and methods according to the present disclosure are configured to control various manufacturing parameters to compensate for difficulties associated with on-ship manufacturing.

In an example, a factory ship includes a plurality of factory units, containers, or compartments each configured to perform a portion of a manufacturing process. For example, each factory unit may include production machinery configured to perform one or more manufacturing steps or processes, such as one or more steps relating to manufacture of a part or component, assembly of two or more components (e.g., assembly of two or more components manufactured in a different factory unit), etc.

The production machinery may include one or more types of assembly robots. In an example, the assembly robots are configured to perform pouring or molding processes, such as pouring, injection molding, die casting, sand casting, centrifugal casting, etc. In other examples, the assembly robots are configured to perform additive manufacturing processes (e.g., 3D printing). Typically, pouring and additive manufacturing processes are sensitive to movement and vibration, and these processes may be difficult to perform in environments and conditions associated with operation and movement of a maritime vessel.

Accordingly, manufacturing systems and methods according to the present disclosure are configured to control and adjust various manufacturing processes to compensate for movement and vibration of a ship at sea. In an example, a factory unit on a factory ship includes an inertial or stabilized platform configured to stabilize the production machinery. In one example, the inertial platform is provided within the factory unit and the production machinery is mounted on the inertial platform. In another example, the factory unit is supported on the inertial platform. The systems and methods (e.g., the inertial platform and associated computing devices, control circuitry, etc.) are configured to receive a plurality of measurement signals indicating movement, orientation, and vibration of the factory ship, the factory unit, etc., and to maintain, based on the plurality of measurement signals, a predetermined (e.g., fixed) orientation of the production machinery.

Manufacturing systems and methods according to the present disclosure include embodiments direct to maritime ships or vessels that comprise an entire factory for fabricating, manufacturing, assembling and testing final products. FIG. 1A shows an example factory ship 101 configured for completely independent control, with or without other types of ships. The factory ship 101 may include propulsion and navigation systems as well as everything needed by a crew to operate and live onboard the factory ship 101. In some versions, the factory ship 101 can include other systems, such as a self-defense system, etc.

The factory ship 101 also has a large capacity to manufacture products while at sea. For example, with reference to FIGS. 1A and 1B, the factory ship 101 includes a plurality of factory compartments, units, or pods, such as a raw material storage unit 111, a body fabrication, finishing, assembly and motor mounting unit 121, a harness fabrication, electronics, sensor and battery assembly and interconnection unit 131, a final assembly and testing unit 141, a final unit storage unit 151, etc. In some examples, one or more of the factory units may be contained within a warehouse 161 onboard the factory ship 101. As used herein, the term "pod" or "unit" can mean an open or closed system or an open or closable transport device, such as a large portable container similar to those used for commercial shipping of large quantities of product at sea.

In some examples, material handling conveyance robots 115 (which can be autonomous) can be used to transfer raw materials between factory units (e.g., from the raw material storage unit 111 to units 121, 131, etc.), transfer products at various stages of manufacture between factory units, transfer raw materials or products to and from one or more assembly lines 171, etc. One or more cranes (mounted permanently or mobile) on the factory ship 101 also can be used to load, unload or otherwise transport the factory units.

As an example, the factory ship 101 can be configured to manufacture a final product such as an unmanned submersible vessel that can be autonomous or remotely controlled. The vessel may be retrievable and reusable. The vessel may use batteries for propulsion, allowing the vessel to be recharged. In this example, the factory unit 121 is configured for fabrication of fin and body, including fabrication of a main tube, wiring, and assembly. The fin can be molded from resin which can be poured, hardened, and extracted in one or more respective factory units. A tube core can be inserted into a clam shell mold, into which resin can be poured, hardened and extracted. The fin and body can then be surface finished. The fins, motors and wiring can be assembled to the body and tested for continuity. In an example embodiment, the factory unit 131 can be configured for assembly of an electronics platform, wiring, and sensors and forming interconnections with a battery and the platform prior to testing the assembled platform. Examples of the factory unit 141 can include inserting the electronics and sensor assembly into the body and connecting all wiring to the electronics and sensor assembly. The finished assembly can be tested electronically and mechanically, and then (optionally) water-proof tested at pressure, sonar tested, etc.

In some examples, various components (e.g., fin and body components) are formed using pouring and molding processes. In an example, components are formed using one or more mixtures, such as a syntactic foam mixture (e.g., a mixture of epoxy resin, epoxy hardener, micro bubbles, etc.). The mixture is poured into various molds (e.g., while avoiding forming air bubbles and other defects while pouring). In other examples, additive manufacturing (e.g., 3D printing) is used to form various components. In one example, servo mounts for high torque servos are formed using additive manufacturing. In another example, battery shells are formed using additive manufacturing. Pouring, molding, and additive manufacturing may be used to form various other components in one or more factory units of the factory ship 101.

The manufacturing systems and methods described herein provide attritable products with resilient (e.g., not easily disturbed or interrupted, even while at sea) supply chains and resilient manufacturing in contested arenas. The maritime vessels described, along with their crew, can provide complete contractor services, manufacturing and fabrication modeling, design, resin and mold pouring and extraction, gap sealing, component assembly, electronic and sensor assembly, final assembly, body surface finishing, painting, gel coating, and application and curing of spray resins or viscous coatings.

Moreover, these systems and methods can provide mechanical, electrical, water impingement, and/or sensor testing of the final products. Each function or type of manufacturing can be contained in a separate mobile container that can be retrieved and transported (e.g., by an autonomous robot and/or material handling conveyance robot) from warehouse factory units on the factory ship 101 and assembled using one or more assembly lines 171 for a particular product, or for a particular set of manufacturing techniques. Examples include, but are not limited to, additive manufacturing, 3D printing, extrusion, and sand casting. Effectively, entire assembly lines can be constructed on the factory ship 101 with thee modular solution described herein. In some examples, the warehouse 161 can contain numerous pods or containers (such as the factory units 111, 121, 131, 141, 151, etc.) of raw materials, transfer robots, fabrication and/or manufacturing stations, conveyors, assembly stations, finishing stations, testing stations, and final product storage stations. These pods, containers, and stations can be formed into separate, independent (or dependent) complete factories, which can be organized into parallel, autonomous assembly lines, to quickly and efficiently build whichever end products are needed for a particular mission or function.

In some examples, factory planning software configured to organize and plan a layout for each factory or factory unit on the factory ship 101. Layouts and implementations of the factory units can then be assembled in an agile and flexible manner based on outputs of the factory planning software.

Embodiments of the factory ship 101 can be implemented based on various missions or mission types. For example, one mission can be to manufacture attritable devices (e.g., that can be reusable, disposable, or affordably lost in attrition), such as for specific military missions. All components and other resources needed to build these devices can be warehoused in libraries that can later be installed and assembled to produce the devices when needed. After completion of a mission, the assembly lines can then be quickly disassembled and stored in libraries or a warehouse on the factory ship 101 to provide capacity for a next mission.

In alternate missions and embodiments, the factory ship 101 can be moored in a harbor (or anchored near shore, facilitating more stable environments and less motion of the factory ship 101 as compared to being at sea) to complete similar tasks for land-based needs, such as disaster recovery (e.g., as an NGO), building temporary shelter units or providing other food, clothing, and shelter needs on land. Thus, the factory ship 101 can operate as its own complete infrastructure, even in a situation or on a mission with no resources or capability to provide the factory ship 101 with any assistance from external entities.

The factory ship 101 can be further configured to perform commercial missions between ports, such as stopping at various ports to acquire raw materials and/or pods or containers used during manufacturing. Then, while at sea between such ports, at least portions of the manufacturing process can continue or resume so that there is little to no manufacturing downtime while in port or traveling to a next port. Such "offshore manufacturing" can reduce downtime between receiving an order and receipt of goods or containers. In addition, the factory ship 101 can readily accommodate order changes dynamically, even while in operation, effectively working as a free port.

Thus, the factory ship 101 can provide manufacturing at the point of need. The containers can be delivered at sea or in port, and can be delivered via land-based supply chains such as truck or rail, to make a "micro-factory" for any needs, such as surge manufacturing.

In some examples, manufacturing systems and methods of the present disclosure implement techniques for air filtration of the individual pods or units so that the curing of epoxy or other volatiles can be performed in controlled conditions. In addition, power delivery to individual units can be managed to coordinate power consumption among the units. Moreover, the system can monitor weather conditions to account for and make adjustments due to various weather parameters.

FIG. 2 is a side view of another example factory ship 200 containing and/or supporting a plurality of factory units 204, which may include, but are not limited to, any of the factory units described herein, storage units, assembly units, assembly line units or stations, etc. The factory units 204 may be arranged within a cargo hold 208 of the factory ship 200, supported on a deck 212 of the factory ship 200, or combinations thereof.

Each of the factory units 204 (e.g., containers or compartments) is configured to perform at least portion of a manufacturing process. For example, each of the factory units 204 may include production machinery configured to perform one or more manufacturing steps or processes, such as one or more steps relating to manufacture of a product part or component, assembly of two or more components (e.g., assembly of two or more components manufactured in a different factory unit), etc. Some of the factory units 204 may be configured to perform multiple manufacturing processes or steps, and two or more of the factory units 204 may configured to perform a same manufacturing process.

The production machinery may include one or more types of assembly robots configured to perform pouring or molding processes and/or additive manufacturing processes, which are sensitive to movement and vibration and various environmental factors. Movement and vibration may vary based on movement (e.g., pitch, roll, yaw, etc.) and vibration of the factory ship 200 as well as the environmental factors, such as weather and temperature, wind, sea conditions (e.g., wave height), etc.

Movement, vibration, and environmental factors may also vary at different locations on or within the factory ship 200. For example, movement for each of the factory units 204 may vary based on: whether the factory unit 204 is located within the cargo hold 208 or on the deck 212; elevation (e.g., a position in a vertical stack of the factory units 204); lateral position (e.g. a position relative to a longitudinal axis of the factory ship 200); and longitudinal position (e.g., whether the factory unit 204 is nearer to a lateral axis, stern, or bow of the factory ship 200). Similarly, vibration and environmental factors may vary based on location of the factory units 204, proximity to various ship components (e.g., proximity to a motor/engine of the factory ship 200), etc. Further, in some examples, the factory units 204 are mobile. Accordingly, the movement, vibration, and environmental factors affecting a particular factory unit 204 may vary as a location of the factory unit 204 varies. Accordingly, each position of the factory units 204 may be associated with a respective set of calibration data.

In this manner, manufacturing systems and methods according to the present disclosure are configured to control and adjust various manufacturing processes to compensate for movement and vibration of the factory ship 200, environmental factors, and locations of the factory units 204 on the factory ship 200.

FIG. 3 shows an example factory unit 300 according to the present disclosure. The factory unit 300 includes one or more stabilization or adjustment mechanisms or devices, such as inertial platforms 304 (e.g., gyro-stabilized platforms such as gimbaled platforms, strapdown platforms, etc.) configured to stabilize a respective production machine or machinery 308. As shown, each production machine 308 is supported on a different inertial platform 304. In other examples, two or more of the production machines 308 may be supported on a same inertial platform 304. For example, a single inertial platform 304 may be within the factory unit 300 and all of the production machine 308 may be mounted on the inertial platform 304. In another example, the entire factory unit 300 is supported on an inertial platform 312. The inertial platform 312 may be provided instead of or in addition to the inertial platforms 304.

In some examples, the inertial platform 312 may support two or more of the factory units 300. In one example, the inertial platform 312 may be integrated with (e.g., form a portion of) a floor surface of the factory ship, such as a portion of a deck, a floor of a cargo hold, etc. In still other examples, some aspects of systems and methods of the present disclosure described herein may be implemented without inertial platforms.

In some examples, the factory unit 300 includes one or more vibration isolation elements 316 arranged between various components, such as between the inertial platforms 304 and the production machines 308, between a lower surface or floor of the factory unit 300 and the inertial platforms 304, between the lower surface or floor of the factory unit 300 and the inertial platform 312, etc. For example, the vibration isolation elements 316 include foam pads, air bags, dampers, springs, etc. configured to isolate the production machines 304 from vibration associated with movement and operation of the factory ship, including high-frequency vibration associated with a motor or engine, electronics, etc.

The production machines 304 may each include at least one type of assembly robot. In an example, at least one of the production machines 304 includes an assembly robot configured to perform a pouring/molding process or an additive manufacturing process. Typically, pouring/molding and additive manufacturing processes are sensitive to movement and vibration. The factory unit 300 according to the present disclosure is configured to compensate for movement, orientation, and vibration of the factory ship, as well as environmental factors and control the production machines 304 accordingly.

For example, the inertial platforms 304 are configured to receive a plurality of measurement signals indicating movement, orientation, and vibration of the factory ship, the factory unit 300, etc., and to maintain, based on the plurality of measurement signals, a predetermined (e.g., fixed) orientation of the production machines 308. Further, a factory unit control system 320 is configured to control operating parameters of the production machines 308 based on one or more inputs, measurements, sensed values, etc., which may include, but are not limited to, inputs from the production machines 308, inputs from the inertial platforms 304, inputs from various sensors arranged on or within the factory unit 300 (e.g., vibration sensors, temperature sensors, movement sensors, humidity sensors, etc.), and external inputs (e.g., inputs from other factory units, user inputs, predictive data, etc.).

Although shown with a single factory unit control system 320, the factory unit 300 may include two or more factory unit control systems 320. In other examples, one or more of the factory unit control systems 320 may be located external to the factory unit 300. For example, a single factory unit control system 320 may be associated with a plurality of the factory units 300. The factory unit control system 320 may include one or a plurality of computing devices, including one or more remotely-located computing devices, remote servers, cloud computing systems, etc. Further, the factory unit control system 320 may be configured to communicate with (e.g., receive inputs from) one or more remote computing systems, servers, cloud computing systems, communication satellites, etc.

FIG. 4 shows a block diagram of an example computing device 400 configured to implement functions of the systems and methods described herein according to the present disclosure. For example, one or more of the computing devices 400 may implement or be implemented by the one or more components of the factory unit control system 320. Systems described herein may implement a single computing device, a plurality of computing devices, etc., configured to individually and/or collectively perform functions related to the systems and methods of the present disclosure.

The computing device 400 may include control circuitry 404 that may be, for example, one or more processors or processing devices, a central processing unit processor, an integrated circuit or any suitable computing or computational device, an operating system 408, a memory 412, executable code 416, input devices or circuitry 420, and output devices or circuitry 424. The control circuitry 404 (or one or more controllers or processors, possibly across multiple units or devices) may be configured to implement functions of the systems and methods described herein. More than one of the computing devices 400 may be included in, and one or more of the computing devices 400 may act as the components of, a system according to embodiments of the disclosure. Various components of the computing device 400 may be implemented with same or different circuitry, same or different processors or processing devices, etc.

The operating system 408 may be or may include any code segment (e.g., one similar to the executable code 1016 described herein) configured and/or configured to perform tasks involving coordination, scheduling, arbitration, supervising, controlling or otherwise managing operation of the control circuitry 404 (e.g., scheduling execution of software programs or tasks or enabling software programs or other hardware modules or units to communicate). The operating system 408 may be a commercial operating system. The operating system 408 may be an optional component (e.g., in some embodiments, a system may include a computing device that does not require or include the operating system 408). For example, a computer system may be, or may include, a microcontroller, an application specific circuit (ASIC), a field programmable array (FPGA), network controller (e.g., CAN bus controller), associated transceiver, system on a chip (SOC), and/or any combination thereof that may be used without an operating system.

The memory 412 may be or may include, for example, Random Access Memory (RAM), read only memory (ROM), Dynamic RAM (DRAM), Synchronous DRAM (SD-RAM), a double data rate (DDR) memory chip, Flash memory, volatile memory, non-volatile memory, cache memory, a buffer, a short-term memory unit, a long-term memory unit, or other suitable memory units or storage units. The memory 412 may be or may include a plurality of memory units, which may correspond to same or different types of memory or memory circuitry. The memory 412 may be a computer or processor non-transitory readable medium, or a computer non-transitory storage medium, e.g., RAM.

The executable code 416 may be any executable code, e.g., an application, a program, a process, task, or script. The executable code 416 may be executed by the control circuitry 404, possibly under control of the operating system 408. Although, for the sake of clarity, a single item of the executable code 416 is shown, a system according to some embodiments of the disclosure may include one or more executable code segments similar to the executable code 416 that may be loaded into the memory 412 and cause the control circuitry 404 to carry out methods described herein. Where applicable, the terms "process" and "executable code" may be used interchangeably herein. For example, verification, validation and/or authentication of a process may mean verification, validation and/or authentication of executable code.

In some examples, the memory 412 may include non-volatile memory having the storage capacity of a storage system. In other examples, the computing device 400 may include or communicate with a storage system and/or database. Such a storage system may include, for example, flash memory, memory that is internal to, or embedded in, a micro controller or chip, a hard disk drive, a solid-state drive, a CD-Recordable (CD-R) drive, a Blu-ray disk (BD), a universal serial bus (USB) device or other suitable removable and/or fixed storage unit. Content may be stored in the storage system and loaded from the storage system into the memory 412 where it may be processed by the control circuitry 404.

The input circuitry 420 may be or may include any suitable input devices, components, or systems, e.g., physical sensors such as accelerometers, thermometers, microphones, analog to digital converters, etc., a detachable keyboard or keypad, a mouse, etc. The output circuitry 424 may include one or more (possibly detachable) displays or monitors, motors, servo motors, speakers and/or any other suitable output devices. Any applicable input/output (I/O) devices may be connected to the control circuitry 404. For example, a wired or wireless network interface card (NIC), a universal serial bus (USB) device, or external storage device may be included in the input circuitry 420 and/or the output circuitry 424.

The computing device 400 may be communicatively connected to a network 430 via a network interface card. The network 430 may be a public network (e.g., connected to the Internet via wired (Ethernet) or wireless (WiFi)), a private network (e.g., a local area network (LAN) or wide area network (WAN)), or a combination thereof. Network 430 may also include a node or nodes on the Internet of Things (IoT). The network 20 may be a cellular network. It will be recognized that any suitable number of input devices and output devices may be operatively connected to the control circuitry 404. For example, the input circuitry 420 and the output circuitry 424 may be used by a technician or engineer in order to connect to the control circuitry 404, update software, and the like.

Embodiments may include an article such as a computer or processor non-transitory readable medium, or a computer or processor non-transitory storage medium, such as for example memory, a disk drive, or USB flash memory, encoding, including or storing instructions (e.g., computer-executable instructions, which, when executed by a processor or controller, carry out methods disclosed herein), a storage medium such as the memory 412, computer-executable instructions such as the executable code 416, and a controller such as the control circuitry 404.

The storage medium may include, but is not limited to, any type of disk including magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Embodiments of the disclosure may include components such as, but not limited to, a plurality of central processing units (CPU) or any other suitable multi-purpose or specific processors or controllers (e.g., controllers similar to the control circuitry 404), a plurality of input units, a plurality of output units, a plurality of memory units, and a plurality of storage units, etc. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

In some embodiments, a system may include or may be, for example, a plurality of components that include a respective plurality of central processing units, e.g., a plurality of CPUs as described, a plurality of CPUs embedded in an on-board system or network, a plurality of chips, FPGAs or SOCs, microprocessors, transceivers, microcontrollers, a plurality of computer or network devices, any other suitable computing device, and/or any combination thereof. For example, a system as described herein may include one or more devices such as the control circuitry 404.

The computing device 400 may include and/or communicate with one or more storage devices or databases 428. For example, the storage database 428 may correspond to a storage device (e.g., a semiconductor storage device, such as a solid-state drive (SSD)) of the computing device 400, a remote storage device or database, a cloud computing system, etc. The storage database 428 may store data accessible by one or more of the factory unit control systems 320.

In some examples, the computing device 400 may implement an artificial intelligence (AI) engine configured to execute one or more AI or machine learning (ML) models 432, etc. trained using data ("training data") obtained during operation of the product machines and performance of various manufacturing processes. A training engine 434 may execute via a server or the computing device 400, for example, to train the one or more ML models 432. The ML models 432 may be implemented in computer instructions executable by one or more processing devices of the computing device 400, a server, a cloud-based computing system, the training engine 434, or the like. For example, the training data may include data indicating results of various manufacturing processes (e.g., success and failures, defect counts, etc.) and corresponding conditions (e.g., movement, location on the ship, etc.) during the manufacturing processes. Various components of the training data, AI engine, ML models, etc. may be stored within the computing device 400 or external to the computing device 400 (e.g., in a remote server, a cloud computing system, etc.).

In this manner, the computing device 400 is configured to control, using the trained models, various operating parameters of the production machines, including, but not limited to, changing operating parameters during processing steps and selectively starting, stopping, and pausing processes based on outputs of the models.

The training engine 434 may be a rackmount server, a router computer, a personal computer, a portable digital assistant, a smartphone, a laptop computer, a tablet computer, a netbook, a desktop computer, an Internet of Things (IoT) device, any other desired computing device, or any combination of the above. The training engine 434 may be cloud-based, be a real-time software platform, include privacy software or protocols, and/or include security software or protocols. To generate the one or more machine learning models 432, the training engine 434 may train the one or more machine learning models 432.

The one or more machine learning models 432 may refer to model artifacts created by the training engine 434 using training data that includes training inputs and corresponding target outputs. The training engine 434 may find patterns in the training data wherein such patterns map the training input to the target output and generate the machine learning models 432 that capture these patterns.

As described in more detail below, the one or more machine learning models 432 may comprise, e.g., a single level of linear or non-linear operations (e.g., a support vector machine [SVM]) or the machine learning models 432 may be a deep network, i.e., a machine learning model comprising multiple levels of non-linear operations. Examples of deep networks are neural networks, including generative adversarial networks, convolutional neural networks, recurrent neural networks with one or more hidden layers, and fully connected neural networks (e.g., each neuron may transmit its output signal to the input of the remaining neurons, as well as to itself). For example, the machine learning model may include numerous layers and/or hidden layers that perform calculations (e.g., dot products) using various neurons.

FIG. 5 illustrates steps of an example method 500 for performing a maritime manufacturing process according to the principles of the present disclosure. For example, one or more computing devices, processors or processing devices, etc. are configured to execute instructions to implement the method 500, such as one or more processors of the systems described herein. In an example, the computing system 400 implements all or portions of the method 500.

At 504, the method 500 receives a request to perform a manufacturing process or step. For example, a computing device, such as a computing device associated with the factory unit control system 320, receives the request via a user interface, from an automated assembly algorithm or program, etc. In some examples, the request is received from and/or by a factory unit configured to perform the manufacturing process. In other examples, the request is received from and/or by a factory unit that performed a previous manufacturing process on a same part or component, and the request corresponds to a request to perform a next manufacturing process or step in the same or a different factory unit.

At 508, the method 500 identifies an available factory unit that is configured to perform the manufacturing process identified in the request. For example, each factory unit may be assigned a unique identifier and data is stored (e.g., in the storage database 428) correlating each factory unit to various characteristics and capabilities, including location/position on the factory ship, types of production machinery and processes implemented by the factory unit, information indicating whether the factory unit includes one or more inertial platforms, etc.

In some examples, each position on the factory ship is assigned a location identifier (e.g., a value in an xyz coordinate system), and each location identifier is associated with a respective set of condition data associated with that position. In some examples, the location identifier includes a score or value indicative of favorability of conditions for a particular manufacturing process (e.g., an integer between 1 and 100, where a lower value indicates unfavorable conditions and a higher value indicates favorable conditions).

In some examples, identifying an available factory unit may include determining, using one or more ML models, whether a given factory unit is configured to complete the manufacturing process within a predetermined amount of time, within predetermined manufacturing tolerances or limits, etc., based on predicted conditions during a duration of the manufacturing process. For example, the method 500 receives, as inputs, data indicating current conditions (e.g., movement, orientation, vibration, sea conditions, weather, temperature, processes being performed in adjacent factory units, etc., as described herein) and data indicating future conditions (e.g., a weather forecast or weather changes, predicted sea changes, predicted changes in ship movement or operation, etc.). The method 500 may generate, as outputs, for each of the factory units, respective probabilities that the manufacturing process will be completed successfully (e.g., completed within a predetermined duration and with defects within predetermined tolerances). As used herein, various probabilities may be calculated as a probability value or values, a confidence interval, a non-probabilistic value, a numerical value, etc. As one example, the probability values may correspond to Bayesian probabilities, Markovian probabilities, a stochastic prediction, a deterministic prediction, etc. In an example, identifying an available factory unit may include identifying at least one factory unit having a probability of completing the manufacturing process that is greater than a predetermined threshold.

At 512, the method 500 determines whether an available factory unit was identified. If true, the method 500 proceeds to 516. If false, the method 500 proceeds to 520. At 516, the manufacturing process is performed in the identified factory unit. In some examples, performing the manufacturing process may include transporting a product to the identified factory unit. In other examples, performing the manufacturing process may include starting the manufacturing process in a predetermined time window (e.g., a time window, identified in step 508, in which a probability of completing the manufacturing process is maximized).

At 520, the method 500 determines whether any adjustments can be performed to any operating parameters such that the probability of at least one factory unit will have an associated probability of completing the manufacturing process above the predetermined threshold. As one example, the predetermined threshold may be lowered. In another example, manufacturing tolerances or limits may be adjusted. In another example, a duration of the manufacturing process may be adjusted (e.g., increased or decreased).

In another example, the time window in which the manufacturing process will be perform is shifted (e.g., shifted later in time to a time window in which conditions have changed, the ship has stopped moving, etc.).

In still another example, the method 500 determines whether moving a factory unit to a different position on the ship will cause the probability associated with that factory unit to increase above the predetermined threshold. In other words, the position of a factory unit on the factory ship may cause the probability to be below the threshold (e.g., a position on the ship associated with more vibration, movement, etc.). Accordingly, moving the factory unit to a position associated with less vibration, movement, etc. may increase the probability calculated for the factory unit. In an example, the method 500 recalculates the probabilities for all factory units within a range (e.g., 5%) of the predetermined threshold.

If a result of step 520 is true (e.g., a recalculated probability for at least one of the factory units, with at least one adjustment, is greater than the predetermined threshold), the method 500 continues to 524. If false, the method 500 continues to 504 (e.g., the method 500 continues to identify available factory units in response to requests to perform various manufacturing processes or steps). At 524, the adjustment is performed (e.g., an identified factory unit is moved to a new position on the ship) and the method 500 proceeds to 516.

FIG. 6 illustrates steps of another example method 600 for performing a maritime manufacturing process according to the principles of the present disclosure. For example, one or more computing devices, processors or processing devices, etc. are configured to execute instructions to implement the method 600, such as one or more processors of the systems described herein. In an example, the computing system 400 implements all or portions of the method 600. The method 600 may be executed for both (i) processes being performed in factory units that include stabilization mechanisms as described herein and (ii) processes being performed in factory units that do not include stabilization mechanisms.

At 604, the method 600 (e.g., a factory unit control system) receives a request to perform a manufacturing process or step on a product, component, etc. For example, a computing device, such as a computing device associated with the factory unit control system 320, receives the request via a user interface, from an automated assembly algorithm or program, etc. In some examples, the request is received from and/or by a factory unit configured to perform the manufacturing process. In other examples, the request is received from and/or by a factory unit that performed a previous manufacturing process on a same part or component, and the request corresponds to a request to perform a next manufacturing process or step in the same or a different factory unit. In this example, the method 600 will be described with respect to a request received from/by a factory unit configured to perform the manufacturing process. For example, the request corresponds to a request generated prior to beginning a pouring/molding or additive manufacturing process. The request may be generated by production machinery configured to perform the manufacturing process, a user (e.g., at a user interface of a computing device), a computing device associated with the production machinery, a factory unit control system, etc.

At 608, the method 600 (e.g., a factory unit control system) obtains/receives process constraint data associated with the manufacturing process. The process constraint data may include any data associated with performance of the manufacturing process, including, but not limited to: manufacturing process parameters (e.g., parameters associated with the process being performed, such as type of process, a start time of the process, a duration of process, a priority assigned to the process or the product being manufactured, any movement or vibration constraints, etc.); one or more measurement signals as described herein, such measurements of movement, vibration, orientation, temperature, climate or weather conditions, etc.; and data associated with operation and/or constraints of one or stabilization mechanisms (e.g., an inertial platform, vibration isolation elements, etc.) provided in the corresponding factory unit, such as a maximum vibration, maximum pitch or roll, and maximum rates of change in pitch, roll, yaw, elevation, orientation, etc.

At 612, the method 600 (e.g., the factory unit control system) determines, based on the constraint data, whether to proceed with the manufacturing process. In an example, the method 600 predicts (e.g., using one or more ML models), based on the constraint data, conditions during the duration of the manufacturing process. For example, the method 600 receives, as inputs, the measurement signals and any other data associated with conditions or changes in conditions during the duration of the manufacturing process, such as planned ship movements and operation, weather or climate data, sea condition data, etc. The method 600 predicts future conditions during the duration of the manufacturing process based on current conditions (e.g., as indicated by the measurement signals) and the other data associated with changes in conditions. For example, the method 600 executes an ML model trained to generate outputs indicative of the predicted future conditions, such as values or ranges of values of various measurements during the duration of the manufacturing process. In an example, the outputs include ranges of values (e.g., minimum and maximum values) of measurements including, but not limited to, temperature, vibration, elevation, wave height, roll, and pitch, and may include rates of changes of various measurements, changes in direction, yaw, etc.

The method 600 is configured to, based on the manufacturing process parameters and the predicted future conditions, calculate a probability that the manufacturing process will be completed within a predetermined duration and with defects within predetermined tolerances as described herein. For example, the manufacturing process parameters may indicate one or more limits for various conditions, such maximum roll or pitch, maximum rate of change in yaw or orientation, maximum vibration, etc. Each measurement may have only one corresponding limit or a plurality of limits. For example, the limit for a given measurement may change based on a stage of the manufacturing process. Accordingly, the manufacturing process may require a measurement to be below a first limit for a first stage or portion of the manufacturing process but below a second limit, different than the first limit, for a second stage or portion of the manufacturing process. The method 600 may calculate the probability based on the manufacturing process parameters and predicted conditions during the manufacturing process and determine whether to proceed with the manufacturing process based on the probability (e.g., based on whether the probability exceeds a predetermined threshold).

In some examples, to determine whether to proceed with the manufacturing process, the method 600 may determine whether one or more changes or adjustments can be implemented or various interventions may be performed during the manufacturing process (e.g., to increase the probability that the manufacturing process will be completed successfully). In one example, the method 600 determines whether one or more changes to ship operation, movement, location, etc. may be implemented to enable the manufacturing process. For example, the method 600 may determine whether temporarily stopping the ship, moving the ship to another location, changing a speed of the ship, stopping a motor or engine of the ship, etc. will increase the probability above a threshold. The changes may be implemented for an entire duration or for only a portion of the manufacturing process.

In other examples, to determine whether to proceed with the manufacturing process, the method 600 may determine whether delaying, accelerating, or pausing the manufacturing process (e.g., during portions of the duration where one or more measurements are predicted to exceed corresponding limits) will enable completion of the manufacturing process.

In other examples, the method 600 may determine whether any of the predicted conditions exceed limits of any stabilization mechanisms implemented within the corresponding factory unit. For example, an inertial platform may have operational limits such as maximum pitch or roll, maximum rates of change in pitch, roll, yaw, elevation, orientation, maximum vibration, etc. Accordingly, the method 600 may determine the probability at least in part based on a determination of whether implemented stabilization mechanisms are configured to compensate for the predicted conditions during the manufacturing process.

In still other examples, the method 600 may determine whether the manufacturing process can be completed with correctable flaws. For example, in a pouring process, various conditions can cause ripples or other surface defects in a poured or molded product. In some examples, the ripples or other portions of the poured product can be subsequently removed. Accordingly, the method 600 may determine whether the poured product may be formed with ripples or formed with additional material (e.g., "overpoured") that are subsequently removed to remove defects. In these examples, the method 600 may determine, based on the predicted conditions, an amount of overpouring required to complete the manufacturing process.

In response to a determination, at 612, to proceed with the manufacturing process, the method 600 continues to 616. Otherwise, the method 600 may end or continue to 604.

At 616, the method 600 performs the manufacturing process. Performing the manufacturing process includes performing various adjustments and/or interventions determined at 612. For example, the factory unit control system 320 may be configured to control the manufacturing process based on one or more adjustments or interventions. In an example, the factory unit control system 320 may be configured to control production machinery in accordance with a predetermined program, operating parameters, etc. The predetermined program can be modified (responsive to various calculations performed at 612) based on the predicted conditions as described herein.

The method 600 is further configured to, in real-time, continue to receive measurement signals and other data during the manufacturing process and calculate predicted conditions during a remainder of the manufacturing process. In this manner, the method 600 may continue to determine whether the manufacturing process will be successfully completed as defined herein and perform various adjustments or interventions accordingly. For example, the method 600 may determine whether any measurements, rates of change, etc. exceed respective thresholds and, based on the determination, selectively pause the manufacturing process.

FIG. 7 illustrates steps of an example method 700 for using a graphical user interface to configure a factory ship according to principles of the present disclosure. For example, one or more computing devices, processors or processing devices, etc. are configured to execute instructions to implement the method 700, such as one or more processors of the systems described herein. In an example, the computing device 400 implements all or portions of the method 700. The method 700 may be performed by processing logic that may include hardware (circuitry, dedicated logic, etc.), software, or a combination of both. The method 700 and/or each of their individual functions, subroutines, or operations may be performed by one or more processing devices of a computing device (e.g., any component (computing device 400, training engine 434, machine learning models 432, etc.) of FIG. 4) implementing the method 700. The method 700 may be implemented as computer instructions stored on a memory device and executable by the one or more processors. In certain implementations, the method 700 may be performed by a single processing thread. Alternatively, the method 700 may be performed by two or more processing threads, each thread implementing one or more individual functions, routines, subroutines, or operations of the methods.

For simplicity of explanation, the method 700 is depicted and described as a series of operations. However, operations in accordance with this disclosure can occur in various orders or concurrently, and with other operations not presented and described herein. For example, the operations depicted in the method 700 may occur in combination with any other operation of any other method disclosed herein. Furthermore, not all illustrated operations may be required to implement the method 700 in accordance with the disclosed subject matter. In addition, those skilled in the art will understand and appreciate that the method 700 could alternatively be represented as a series of interrelated states via a state diagram or events.

In some embodiments, one or more machine learning models may be generated and trained by the artificial intelligence engine and/or the training engine to perform one or more of the operations of the methods described herein. For example, to perform the one or more operations, the processing device may execute the one or more machine learning models. In some embodiments, the one or more machine learning models may be iteratively retrained to select different features capable of enabling optimization of output. The features that may be modified may include a number of nodes included in each layer of the machine learning models, an objective function executed at each node, a number of layers, various weights associated with outputs of each node, and the like.

At 702, the processing device may receive first information pertaining to a configuration of a factory ship. The configuration may include a layout, setup, location, etc. of one or more factory units on a factory ship. The configuration may include physical spaces where the factory units are to be located, electrical connections, power connections, water supplies, and the like that are to be used to connect to the factory units. The factory units may include one or more production machines.

At 704, the processing device may cause a graphical user interface (GUI) to be presented on a computing device. The GUI may represent the configuration of the factory ship. The GUI may include a graphic that depicts a virtual factory ship that includes the same dimensions as a real factory ship. The graphic may include a coordinate space that is used to map and/or arrange one or more factory units in a particular order to enable manufacturing a certain part (e.g., submersible vehicle, submersible object, etc.). The GUI may include one or more graphical elements that enable interacting with the configuration of the factory ship. The graphical elements may include buttons, sliders, cursors, dropdown lists, objects, icons, and the like. An input peripheral (e.g., mouse, keyboard, touchscreen, microphone, etc.) may be used to select (e.g., using one of the graphical elements) one or more of the factory units to receive detailed information about the factory units, such as the production machinery included in the factory units, what parts the factory units are configured to manufacture, what parts or supplies or raw materials are needed by the factory units, and the like.

At 706, the processing device may receive second information pertaining to a mission. The mission may include a sea-based or land-based mission to be performed by one or more people, one or more submersible vehicles, one or more submersible objects, one or more robots, or some combination thereof.

At 708, the processing device may determine, based on the second information, one or more parts required to perform the mission. The one or more parts may be determined based on the type of mission to be performed. For example, if the mission is a reconnaissance mission using an unmanned submersible robot, the parts may include at least a propeller, an engine, a battery, a housing, etc.

At 710, the processing device may determine, based on the one or more parts and the first information, a reconfiguration of the factory ship to enable manufacturing the one or more parts. In some embodiments, the configuration and reconfiguration may include an arrangement, layout, and/or orientation of one or more factory units and/or production machinery including conveyor belts, presses, machines, computers, servers, air compressors, clamps, forklifts, shelves, ladders, pulleys, equipment, and/or any other production machine described herein.

At 712, the processing device may cause the GUI to be modified to represent the reconfiguration of the factory ship. The GUI may be dynamically modified on one or more displays of one or more computing devices (e.g., computer, laptop, smartphone, tablet, etc.) of one or more users. The GUI may present a real-time or near real-time transition of factory units moving around on the factory ship from initial positions to ending positions.

At 714, the processing device may simulate, via the GUI and using a digital twin factory ship model according to the reconfiguration, operation of the factory ship to manufacture the one or more parts. The digital twin factory ship model may include a virtual model of a physical factory ship including the factory units, factory unit control system, sensors, production machinery, and any other physical object included on the factory ship. The digital twin factory ship model may be implemented in computer instructions stored on one or more memory device and executed by one or more processing devices.

The digital twin factory ship model may be programmed to represent a virtual model according to any configuration and/or reconfiguration information. For example, the digital twin factory ship model may include virtual representations of factory units and/or production machinery at certain virtual locations in a coordinate space that maps to a physical coordinate space of a physical factory ship. The digital twin factory ship model may execute to simulate a behavioral lifecycle of manufacturing a certain product using the factory units specified in configuration information based on real-time or simulated sensor measurements, conditions, and the like. If there is an issue at any point in the manufacturing process being simulated, the digital twin factory model, which is presented via the GUI, may present an indication (e.g., an error flag and information related to the error) at the exact point in the manufacturing process where the error occurred. If a part or an object is successfully manufactured, the GUI may present an indication representing the configuration of the factory ship successfully manufactured the part or object.

The simulation may represent certain properties such as physical, chemical, biological, structural, and technical processes and unit operations. These properties, processes, and/or operations may be incorporated into the digital twin factory ship model. Further, mathematical functions and models may be incorporated by the digital twin factory ship model. In some embodiments, the configuration information is used to program the digital twin factory ship model (e.g., the factory units and/or production machinery are arranged and connected based on the configuration information), and the digital twin factory ship model is executed to simulate whether or not a certain product is successfully manufactured.

In some embodiments, the simulation may refer to executing an end-to-end manufacturing path using the digital twin factory ship model programmed based on configuration information. In some embodiments, the simulation may just simulate a portion of the manufacturing path. The GUI may be used to select any or all portions of the manufacturing path to simulate. The GUI may be used to rearrange any aspect of the manufacturing path (e.g., rearrange factory units and/or production machines).

In some embodiments, one or more machine learning models may be trained to interact with the digital twin factory ship model. For example, the machine learning models may receive inputs (e.g., raw materials, available production machinery, available factory units, size of factory ship model, object or part to be manufactured, etc.) and generate outputs (e.g., optimized configuration information). The output may be used to program the digital twin factory ship model. The digital twin factory ship model may be executed by the processing device to solve an optimization problem using the output provided by the machine learning models. At each step in the simulation, data may be fed back into the machine learning models to enable the machine learning models to retrain in real-time or near real-time. As a result, the machine learning models may continuously or continually learn optimal configurations for the factory ship model by using the digital twin factory ship model.

In some embodiments, the processing device may generate a result of the simulation and cause presentation of the result on one or more computing devices. In some embodiments, responsive to receiving a negative result associated with the simulation (e.g., an error occurred during manufacturing at a factory unit and/or production machine), the processing device may generate, using one or more machine learning models, a second reconfiguration of the factory ship to manufacture the one or more parts. For example, the machine learning models may be trained based on labeled inputs (e.g., available factory units, production machines, parts, etc.) mapped to labeled outputs (e.g., configurations of factory units, production machines, parts, etc. that result in manufacturing a desired object or part). In some embodiments, the processing device may simulate, via the GUI and using the digital twin factory ship model according to the second reconfiguration, operation of the factory ship to manufacture the one or more parts.

In some embodiments, one or more machine learning models may be used to generate one or more recommendations based on the simulation. The one or more machine learning models may be trained to receive input (e.g., a simulation result (success, failure), a degree of success or failure, etc.) and generate an output (e.g., the configuration should be implemented, the configuration should be changed to move certain factory units to different positions, etc.). In some embodiments, the output may be one or more probabilities and the highest probability may be selected to provide a recommendation.

FIG. 8 illustrates steps of an example method 800 for arranging one or more factory units and controlling production machines included in the factory units according to principles of the present disclosure. For example, one or more computing devices, processors or processing devices, etc. are configured to execute instructions to implement the method 800, such as one or more processors of the systems described herein. In an example, the computing device 400 implements all or portions of the method 800. The method 800 may be performed by processing logic that may include hardware (circuitry, dedicated logic, etc.), software, or a combination of both. The method 800 and/or each of their individual functions, subroutines, or operations may be performed by one or more processing devices of a computing device (e.g., any component (computing device 400, training engine 434, machine learning models 432, etc.) of FIG. 4) implementing the method 800. The method 800 may be implemented as computer instructions stored on a memory device and executable by the one or more processors. In certain implementations, the method 800 may be performed by a single processing thread. Alternatively, the method 800 may be performed by two or more processing threads, each thread implementing one or more individual functions, routines, subroutines, or operations of the methods.

For simplicity of explanation, the method 800 is depicted and described as a series of operations. However, operations in accordance with this disclosure can occur in various orders or concurrently, and with other operations not presented and described herein. For example, the operations depicted in the method 800 may occur in combination with any other operation of any other method disclosed herein. Furthermore, not all illustrated operations may be required to implement the method 800 in accordance with the disclosed subject matter. In addition, those skilled in the art will understand and appreciate that the method 800 could alternatively be represented as a series of interrelated states via a state diagram or events.

In some embodiments, one or more machine learning models may be generated and trained by the artificial intelligence engine and/or the training engine to perform one or more of the operations of the methods described herein. For example, to perform the one or more operations, the processing device may execute the one or more machine learning models. In some embodiments, the one or more machine learning models may be iteratively retrained to select different features capable of enabling optimization of output. The features that may be modified may include a number of nodes included in each layer of the machine learning models, an objective function executed at each node, a number of layers, various weights associated with outputs of each node, and the like.

At 802, responsive to receiving a positive result associated with the simulation, the processing device may cause, based on the reconfiguration, one or more robots to move one or more factory units. The factory units may be moved and/or transferred from location to location by autonomous robots to form one or more assembly lines on the factory ship. The robots may form the assembly line based on the specified reconfiguration information.

At 804, the processing device may control one or more operating parameters of one or more production machines included in the one or more factory units to manufacture the one or more parts. The processing device may transmit one or more control signals that cause the one or more operating parameters to be modified. The operating parameters may relate to speed, current, voltage, revolutions per minute, temperature, pressure, etc. The processing device may control the production machines by modifying the operating parameters in real-time or near real-time.

FIG. 9 illustrates steps of another example method 900 for using a graphical user interface to configure a factory ship according to principles of the present disclosure. For example, one or more computing devices, processors or processing devices, etc. are configured to execute instructions to implement the method 900, such as one or more processors of the systems described herein. In an example, the computing device 400 implements all or portions of the method 900. The method 900 may be performed by processing logic that may include hardware (circuitry, dedicated logic, etc.), software, or a combination of both. The method 900 and/or each of their individual functions, subroutines, or operations may be performed by one or more processing devices of a computing device (e.g., any component (computing device 400, training engine 434, machine learning models 432, etc.) of FIG. 4) implementing the method 800. The method 900 may be implemented as computer instructions stored on a memory device and executable by the one or more processors. In certain implementations, the method 900 may be performed by a single processing thread. Alternatively, the method 900 may be performed by two or more processing threads, each thread implementing one or more individual functions, routines, subroutines, or operations of the methods.

For simplicity of explanation, the method 900 is depicted and described as a series of operations. However, operations in accordance with this disclosure can occur in various orders or concurrently, and with other operations not presented and described herein. For example, the operations depicted in the method 900 may occur in combination with any other operation of any other method disclosed herein. Furthermore, not all illustrated operations may be required to implement the method 900 in accordance with the disclosed subject matter. In addition, those skilled in the art will understand and appreciate that the method 900 could alternatively be represented as a series of interrelated states via a state diagram or events.

In some embodiments, one or more machine learning models may be generated and trained by the artificial intelligence engine and/or the training engine to perform one or more of the operations of the methods described herein. For example, to perform the one or more operations, the processing device may execute the one or more machine learning models. In some embodiments, the one or more machine learning models may be iteratively retrained to select different features capable of enabling optimization of output. The features that may be modified may include a number of nodes included in each layer of the machine learning models, an objective function executed at each node, a number of layers, various weights associated with outputs of each node, and the like.

At 902, the processing device receives, via a graphical user interface presented on one or more computing devices, one or more inputs pertaining to the reconfiguration. The one or more inputs may be represented as graphical elements (e.g., buttons, slide bars, dropdown lists, icons, input boxes, cursors, etc.) on the graphical user interface. The inputs received may pertain to an addition, subtraction, or modification of an aspect of the reconfiguration. For example, the aspect may pertain to moving one or more factory units, modifying a production machine included in the one or more factory units, modifying one or more connections (e.g., power, communication, ventilation, etc.) between one or more factory units and/or production machines, adding a factory unit and/or production machine to the manufacturing path, removing a factory unit and/or production machine from a manufacturing path, etc.

At 904, the processing device may modify, based on the one or more inputs, the reconfiguration to generate a second reconfiguration. The second reconfiguration may include information that specifies the layout, arrangement, orientation, connection, location, and the like of one or more factory units and/or one or more production machines on the factory ship to enable manufacturing one or more desired products, parts, objects, vehicles, etc.

At 906, the processing device may simulate, via the graphical user interface and using the digital twin factory ship model according to the second reconfiguration, operation of the factory ship to manufacture the one or more parts. As discussed further herein, the digital twin factory ship model may be programmed to generate a virtual model of the factory ship based on the second reconfiguration. The digital twin factory ship model may be executed to visually simulate the manufacturing process via the graphical user interface.

FIG. 10 shows an example graphical user interface 1000 used to configure factory units of a factory ship according to principles of the present disclosure. The graphical user interface 1000 may include one or more graphical elements that enable interacting with a first configuration 1002 including a first arrangement of factory units 1004, 1006, and 1008, etc. in a first assembly line on a factory ship. In some embodiments, a user may user an input peripheral (e.g., touchscreen) to select (represented by square 1001) a factory unit 1004 and move it (represented by dashed line 1010) to a second configuration (e.g., reconfiguration) in a second assembly line on the factory ship. Further, the user may rearrange the other factory units as desired to optimize or make possible the production of a certain part, product, object, vehicle, etc. As depicted, the user has moved factory unit 1006 from the first assembly in the first configuration to a different position in the manufacturing path in the second assembly line of the second configuration. Also, the user has moved factory unit 1008 from the first assembly line in the first configuration to a different position in the manufacturing path in the second assembly line of the second configuration.

A machine learning model may be trained to dynamically rearrange the factory units to optimize a manufacturing path. That is, the machine learning model may receive inputs (e.g., available factory units and/or production machinery, available raw materials, desired product, object, part to be manufactured, etc.) and generate an output of a desired manufacturing path (e.g., which includes an arrangement of factory units and/or production machines) to manufacture a desired part, product, object, vehicle, etc.

Once the second configuration is complete, a processing device may run a simulation that executes the digital twin factory ship model according to the second configuration. As described further herein, any success and/or failure points may be indicated via the graphical user interface in real-time or near real-time as the simulation is performed. Further, one or more machine learning models may be trained to generate recommendations to further optimize the manufacturing path.

In some embodiments, once a configuration is determined to be successful and/or accepted, the processing device may cause one or more robots and/or computing devices to implement the manufacturing path associated with the assembly line. As such, the one or more robots may locate the factory units and/or production machines included in the accepted configuration on the factory ship, obtain the factory units and/or production machines, physically move the factory units and/or production machines from an initial location to a desired location, connect (e.g., electrically, physically, etc.) the factory units together and/or to the factory ship (e.g., electrically, physically, etc.), and the like.

FIG. 11 shows an example graphical user interface 1100 used to simulate a maritime manufacturing process via production machinery 1102 and 1104 within a factory unit 1101 according to principles of the present disclosure. As depicted, a virtual model 1110 representing the digital twin factory ship model is being executed to simulate a manufacturing process according to a selected configuration. The configuration includes information that specifies the production machinery 1102 is the first unit in the manufacturing path and it produces a first object 1106 that is output onto a conveyor belt 1108. The conveyor belt 1108 moves (represented as dashed line 1112) the object to the production machinery 1104 at a terminal end of the manufacturing path within the factory unit 1101.

The simulation may be performed by the virtual model of the digital twin factory ship model in real-time or near real-time. Notifications and/or recommendations may be dynamically displayed on the graphical user interface 1100 during the simulation. For example, if there is a bottleneck in the manufacturing path such that objects pile up for more than a threshold period of time, a machine learning model may be trained to output a recommendation that one or more factory units be rearranged to enhance throughput.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom," and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Also, the use of "a" or "an" is employed to describe elements and components described herein. This is done merely for convenience and to give a general sense of the scope of the invention. This description should be read to include one or at least one and the singular also includes the plural unless it states otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the specification, skilled artisans will appreciate that certain features which are, for clarity, described herein in the context of separate embodiments, can also be provided in combination in a single embodiment. Conversely, various features that are, for brevity, described in the context of a single embodiment, can also be provided separately or in any sub-combination. Further, references to values stated in ranges include each and every value within that range.

Clauses
1. A computer-implemented method comprising:
   receiving first information pertaining to a configuration of a factory ship;
   causing a graphical user interface (GUI) to be presented on a computing device, wherein the GUI represents the configuration of the factory ship;
   receiving second information pertaining to a mission;
   determining, based on the second information, one or more parts required to perform the mission;
   determining, based on the one or more parts and the first information, a reconfiguration of the factory ship to enable manufacturing the one or more parts; and
   causing the GUI to be modified to represent the reconfiguration of the factory ship;
   simulating, via the GUI and using a digital twin factory ship model of the reconfiguration, operation of the factory ship to manufacture the one more parts.
2. The computer-implemented method of any clause herein, wherein the mission comprises a sea-based or land-based mission to be performed by one or more people, one or more submersible vehicles, one or more submersible objects, one or more robots, or some combination thereof.
3. The computer-implemented method of any clause herein, further comprising generating a result of the simulation and causing presentation of the result on the computing device.
4. The computer-implemented method of any clause herein, further comprising using one or more machine learning models to generate one or more recommendations based on the simulation.

5. The computer-implemented method of any clause herein, further comprising, responsive to receiving a positive result associated with the simulation, causing, based on the reconfiguration, one or more robots to move one or more factory units.

6. The computer-implemented method of any clause herein, further comprising controlling one or more operating parameters of one or more production machines included in the one or more factory units to manufacture the one or more parts.

7. The computer-implemented method of any clause herein, further comprising:
   responsive to receiving a negative result associated with the simulation, generating, using one or more machine learning models, a second reconfiguration of the factory ship to manufacture the one or more parts; and
   simulating, via the GUI and using the digital twin factory ship model according to the second reconfiguration, operation of the factory ship to manufacture the one or more parts.

8. The computer-implemented method of any clause herein, wherein the configuration and/or reconfiguration comprise an arrangement, layout, and/or orientation of one or more factory units and/or production machinery comprising conveyor belts, presses, machines, computers, servers, air compressors, clamps, forklifts, shelves, ladders, pulleys, equipment, or some combination thereof.

9. The computer-implemented method of any clause herein, further comprising:
   receiving, via the GUI presented on one or more computing devices, one or more inputs pertaining to the reconfiguration;
   modifying, based on the one or more inputs, the reconfiguration to generate a second reconfiguration; and
   simulating, via the GUI and using the digital twin factory ship model according to the second reconfiguration, operation of the factory ship to manufacture the one more parts.

10. A system comprising:
    a memory device storing instructions; and
    a processing device communicatively coupled to the memory device, wherein the processing device executes the instructions to:
    receive first information pertaining to a configuration of a factory ship;
    cause a graphical user interface (GUI) to be presented on a computing device, wherein the GUI represents the configuration of the factory ship;
    receive second information pertaining to a mission;
    determine, based on the second information, one or more parts required to perform the mission;
    determine, based on the one or more parts and the first information, a reconfiguration of the factory ship to enable manufacturing the one or more parts; and
    causing the GUI to be modified to represent the reconfiguration of the factory ship;
    simulating, via the GUI and using a digital twin factory ship model of the reconfiguration, operation of the factory ship to manufacture the one more parts.

11. The system of any clause herein, wherein the mission comprises a sea-based or land-based mission to be performed by one or more people, one or more submersible vehicles, one or more submersible objects, one or more robots, or some combination thereof.

12. The system of any clause herein, wherein the processing device generates a result of the simulation and causing presentation of the result on the computing device.

13. The system of any clause herein, wherein the processing device uses one or more machine learning models to generate one or more recommendations based on the simulation.

14. The system of any clause herein, wherein, responsive to receiving a positive result associated with the simulation, the processing device causes, based on the reconfiguration, one or more robots to move one or more factory units.

15. The system of any clause herein, wherein the processing device controls one or more operating parameters of one or more production machines included in the one or more factory units to manufacture the one or more parts.

16. The system of any clause herein, wherein the processing device:
    responsive to receiving a negative result associated with the simulation, generating, using one or more machine learning models, a second reconfiguration of the factory ship to manufacture the one or more parts; and
    simulating, via the GUI and using the digital twin factory ship model according to the second reconfiguration, operation of the factory ship to manufacture the one or more parts.

17. The system of any clause herein, wherein the configuration and/or reconfiguration comprise an arrangement, layout, and/or orientation of one or more factory units and/or production machinery comprising conveyor belts, presses, machines, computers, servers, air compressors, clamps, forklifts, shelves, ladders, pulleys, equipment, or some combination thereof.

18. The system of any clause herein, wherein the processing device:
    receives, via the GUI presented on one or more computing devices, one or more inputs pertaining to the reconfiguration;
    modifies, based on the one or more inputs, the reconfiguration to generate
    a second reconfiguration; and
    simulates, via the GUI and using the digital twin factory ship model according to the second reconfiguration, operation of the factory ship to manufacture the one more parts.

19. A tangible, non-transitory computer-readable medium storing instructions that, when executed, cause a processing device to:
    receive first information pertaining to a configuration of a factory ship;
    cause a graphical user interface (GUI) to be presented on a computing device, wherein the GUI represents the configuration of the factory ship;
    receive second information pertaining to a mission;
    determine, based on the second information, one or more parts required to perform the mission;
    determine, based on the one or more parts and the first information, a reconfiguration of the factory ship to enable manufacturing the one or more parts; and
    causing the GUI to be modified to represent the reconfiguration of the factory ship;
    simulating, via the GUI and using a digital twin factory ship model of the reconfiguration, operation of the factory ship to manufacture the one more parts.

20. The computer-readable medium of any clause herein, wherein the processing device:
responsive to receiving a positive result associated with the simulation, causes, based on the reconfiguration, one or more robots to move one or more factory units; and
controls one or more operating parameters of one or more production machines included in the one or more factory units to manufacture the one or more parts.

What is claimed is:

1. A computer-implemented method comprising:
receiving first information pertaining to a configuration of a factory ship;
causing a graphical user interface (GUI) to be presented on a computing device, wherein the GUI represents the configuration of the factory ship;
receiving second information pertaining to a mission;
determining, based on the second information, one or more parts required to perform the mission;
determining, based on the one or more parts and the first information, a reconfiguration of the factory ship to enable manufacturing the one or more parts; and
causing the GUI to be modified to represent the reconfiguration of the factory ship;
simulating, via the GUI and using a digital twin factory ship model of the reconfiguration, operation of the factory ship to manufacture the one more parts.

2. The computer-implemented method of claim 1, wherein the mission comprises a sea-based or land-based mission to be performed by one or more people, one or more submersible vehicles, one or more submersible objects, one or more robots, or some combination thereof.

3. The computer-implemented method of claim 1, further comprising generating a result of the simulation and causing presentation of the result on the computing device.

4. The computer-implemented method of claim 1, further comprising using one or more machine learning models to generate one or more recommendations based on the simulation.

5. The computer-implemented method of claim 1, further comprising, responsive to receiving a positive result associated with the simulation, causing, based on the reconfiguration, one or more robots to move one or more factory units.

6. The computer-implemented method of claim 5, further comprising controlling one or more operating parameters of one or more production machines included in the one or more factory units to manufacture the one or more parts.

7. The computer-implemented method of claim 1, further comprising:
responsive to receiving a negative result associated with the simulation, generating, using one or more machine learning models, a second reconfiguration of the factory ship to manufacture the one or more parts; and
simulating, via the GUI and using the digital twin factory ship model according to the second reconfiguration, operation of the factory ship to manufacture the one or more parts.

8. The computer-implemented method of claim 1, wherein the configuration and/or reconfiguration comprise an arrangement, layout, and/or orientation of one or more factory units and/or production machinery comprising conveyor belts, presses, machines, computers, servers, air compressors, clamps, forklifts, shelves, ladders, pulleys, equipment, or some combination thereof.

9. The computer-implemented method of claim 1, further comprising:

receiving, via the GUI presented on one or more computing devices, one or more inputs pertaining to the reconfiguration;
modifying, based on the one or more inputs, the reconfiguration to generate a second reconfiguration; and
simulating, via the GUI and using the digital twin factory ship model according to the second reconfiguration, operation of the factory ship to manufacture the one more parts.

10. A system comprising:
a memory device storing instructions; and
a processing device communicatively coupled to the memory device, wherein the processing device executes the instructions to:
receive first information pertaining to a configuration of a factory ship;
cause a graphical user interface (GUI) to be presented on a computing device, wherein the GUI represents the configuration of the factory ship;
receive second information pertaining to a mission;
determine, based on the second information, one or more parts required to perform the mission;
determine, based on the one or more parts and the first information, a reconfiguration of the factory ship to enable manufacturing the one or more parts; and
causing the GUI to be modified to represent the reconfiguration of the factory ship;
simulating, via the GUI and using a digital twin factory ship model of the reconfiguration, operation of the factory ship to manufacture the one more parts.

11. The system of claim 10, wherein the mission comprises a sea-based or land-based mission to be performed by one or more people, one or more submersible vehicles, one or more submersible objects, one or more robots, or some combination thereof.

12. The system of claim 10, wherein the processing device generates a result of the simulation and causing presentation of the result on the computing device.

13. The system of claim 10, wherein the processing device uses one or more machine learning models to generate one or more recommendations based on the simulation.

14. The system of claim 10, wherein, responsive to receiving a positive result associated with the simulation, the processing device causes, based on the reconfiguration, one or more robots to move one or more factory units.

15. The system of claim 14, wherein the processing device controls one or more operating parameters of one or more production machines included in the one or more factory units to manufacture the one or more parts.

16. The system of claim 10, wherein the processing device:
responsive to receiving a negative result associated with the simulation, generating, using one or more machine learning models, a second reconfiguration of the factory ship to manufacture the one or more parts; and
simulating, via the GUI and using the digital twin factory ship model according to the second reconfiguration, operation of the factory ship to manufacture the one or more parts.

17. The system of claim 10, wherein the configuration and/or reconfiguration comprise an arrangement, layout, and/or orientation of one or more factory units and/or production machinery comprising conveyor belts, presses, machines, computers, servers, air compressors, clamps, forklifts, shelves, ladders, pulleys, equipment, or some combination thereof.

18. The system of claim 10, wherein the processing device:
- receives, via the GUI presented on one or more computing devices, one or more inputs pertaining to the reconfiguration;
- modifies, based on the one or more inputs, the reconfiguration to generate a second reconfiguration; and
- simulates, via the GUI and using the digital twin factory ship model according to the second reconfiguration, operation of the factory ship to manufacture the one more parts.

19. A tangible, non-transitory computer-readable medium storing instructions that, when executed, cause a processing device to:
- receive first information pertaining to a configuration of a factory ship;
- cause a graphical user interface (GUI) to be presented on a computing device, wherein the GUI represents the configuration of the factory ship;
- receive second information pertaining to a mission;
- determine, based on the second information, one or more parts required to perform the mission;
- determine, based on the one or more parts and the first information, a reconfiguration of the factory ship to enable manufacturing the one or more parts; and
- causing the GUI to be modified to represent the reconfiguration of the factory ship;
- simulating, via the GUI and using a digital twin factory ship model of the reconfiguration, operation of the factory ship to manufacture the one more parts.

20. The computer-readable medium of claim 19, wherein the processing device:
- responsive to receiving a positive result associated with the simulation, causes, based on the reconfiguration, one or more robots to move one or more factory units; and
- controls one or more operating parameters of one or more production machines included in the one or more factory units to manufacture the one or more parts.

\* \* \* \* \*